United States Patent
Emoto et al.

(10) Patent No.: US 9,108,321 B2
(45) Date of Patent: Aug. 18, 2015

(54) MOTION PREDICTION CONTROL DEVICE AND METHOD

(71) Applicant: IHI Corporation, Tokyo (JP)

(72) Inventors: Shuhei Emoto, Tokyo (JP); Toshihiro Hayashi, Tokyo (JP); Hajime Banno, Tokyo (JP); Masakazu Fujii, Tokyo (JP); Mitsuharu Sonehara, Tokyo (JP)

(73) Assignee: IHI Corporation, Tokyo (JP)

(*) Notice: Subject to any disclaimer, the term of this patent is extended or adjusted under 35 U.S.C. 154(b) by 76 days.

(21) Appl. No.: 14/078,342

(22) Filed: Nov. 12, 2013

(65) Prior Publication Data
US 2014/0074291 A1 Mar. 13, 2014

Related U.S. Application Data
(63) Continuation of application No. PCT/JP2012/060918, filed on Apr. 12, 2012.

(30) Foreign Application Priority Data

| | | |
|---|---|---|
| May 12, 2011 | (JP) | 2011/106822 |
| May 25, 2011 | (JP) | 2011/116663 |
| May 25, 2011 | (JP) | 2011/116883 |

(51) Int. Cl.
- *G05B 19/418* (2006.01)
- *B25J 13/08* (2006.01)
(Continued)

(52) U.S. Cl.
CPC *B25J 13/08* (2013.01); *B25J 5/007* (2013.01); *B25J 9/1664* (2013.01); *B25J 19/023* (2013.01); *G05B 2219/37436* (2013.01); *G05B 2219/40512* (2013.01)

(58) Field of Classification Search
CPC .......... B25J 13/08; B25J 9/1664; B25J 5/007; B25J 19/023
USPC .................. 700/245, 248, 250, 258
See application file for complete search history.

(56) References Cited

U.S. PATENT DOCUMENTS

| | | | | |
|---|---|---|---|---|
| 7,847,503 | B2 * | 12/2010 | Ooga | 318/568.11 |
| 2006/0197486 | A1 * | 9/2006 | Kubo et al. | 318/568.12 |

(Continued)

FOREIGN PATENT DOCUMENTS

| | | |
|---|---|---|
| CN | 101943916 A | 1/2011 |
| JP | 7-19818 A | 1/1995 |

(Continued)

OTHER PUBLICATIONS

International Search Report issued in corresponding application No. PCT/JP2012/060918, completed Jul. 20, 2012 and mailed Aug. 7, 2012.

(Continued)

*Primary Examiner* — Ian Jen
(74) *Attorney, Agent, or Firm* — Griffin & Szipl, P.C.

(57) ABSTRACT

(A) One or both of an object and a robot are measured by measuring units to acquire sensor information. (B) The internal state of one or both of the object and the robot is predicted and updated by a state estimation unit on the basis of the sensor information. (C) The internal state is stored by a data storage unit. (D) The robot is controlled by a robot control unit. At (B), the internal state is updated by the state estimation unit at an arbitrary timing that is independent of the control cycle of the robot. At (D), a prediction value necessary for controlling the robot is calculated by the robot control unit at a control cycle on the basis of the latest internal state stored in the data storage unit.

19 Claims, 14 Drawing Sheets

(51) Int. Cl.
  *B25J 9/16* (2006.01)
  *B25J 5/00* (2006.01)
  *B25J 19/02* (2006.01)

(56) References Cited

U.S. PATENT DOCUMENTS

| | | | | |
|---|---|---|---|---|
| 2008/0249663 | A1* | 10/2008 | Aoyama | 700/259 |
| 2008/0252248 | A1* | 10/2008 | Lundberg et al. | 318/572 |
| 2009/0171505 | A1* | 7/2009 | Okazaki | 700/258 |
| 2009/0177306 | A1* | 7/2009 | Bosga et al. | 700/103 |
| 2011/0178639 | A1* | 7/2011 | Kwon et al. | 700/261 |
| 2011/0184555 | A1* | 7/2011 | Kosuge et al. | 700/245 |
| 2011/0208356 | A1* | 8/2011 | Kato et al. | 700/253 |

FOREIGN PATENT DOCUMENTS

| | | |
|---|---|---|
| JP | 11-24718 A | 1/1999 |
| JP | 11-327620 A | 11/1999 |
| JP | 2008-4072017 B2 | 4/2008 |
| JP | 4072017 B2 | 4/2008 |
| JP | 2008-4153625 B2 | 9/2008 |
| JP | 4153625 B2 | 9/2008 |
| JP | 2009-4265088 B2 | 5/2009 |
| JP | 4265088 B2 | 5/2009 |
| JP | 2011-209203 A | 10/2011 |

OTHER PUBLICATIONS

Office Action issued in corresponding Chinese application 201280022935.9, issued in Jan. 29, 2015.

Hongtao, Sun, "Application Research on Generalized Predictive Control", Chinese Doctoral Dissertations & Master's Theses Full-Text Databases (Master's), Information Technology Album, I140-231, Mar. 15, 2013.

Sim, T.P. et al., "Multirate predictor control scheme for visual servo control," IEE Proc.-Control Theory Appl., vol .149, No. 2, Mar. 2002, pp. 117-124.

Wu, JiunDe, et al., "An Intersample Predictor Control Scheme Based on Multirate GPC for High-Speed Tracking Tasks," 2003, pp. 1355-1360.

Extended European Search report issued in corresponding application 12782445.6, completed May 21, 2015 and mailed May 29, 2015.

* cited by examiner

MOTION PREDICTION CONTROL DEVICE AND METHOD

This is a Continuation Application in the United States of International Patent Application No. PCT/JP2012/060,918 filed Apr. 24, 2012, which claims priority on Japanese Patent Application Nos. 2011/106822, filed May 12, 2011; 2011/116663, filed May 25, 2011 and 2011/116,883, filed May 25, 2011. The entire disclosures of the above patent applications are hereby incorporated by reference.

TECHNICAL FIELD

The present invention relates to motion prediction control device and method adapted to predict the motion of a workpiece or a robot in an automated apparatus using a robot or the like.

BACKGROUND ART (In the Case where a Robot is Controlled by Measuring the Position of the Robot)

In a control device adapted to control the drive of a robot by calculating the position or the posture of the robot by using information from sensors installed on the robot or outside the robot, the following sensors and measurement methods are generally used to measure the position and the posture of a robot.

(1) Method Using Internal Sensors on a Robot

For example, a gyro sensor mounted on a robot, or an encoder or the like on a wheel is used to measure the velocity, the acceleration, the angular velocity or the like of the robot. A steering angle of a robot is measured by an encoder or the like of a steering unit mounted on the robot.

(2) Method Using External Sensors on a Robot

For example, a range sensor (a laser range finder (LRF), laser radar or the like), a camera, or the like mounted on a robot is used to measure the position or the posture of a landmark around the robot. One or both of the current position and posture are measured by a GPS compass or the like installed on the robot.

(3) Method for Measuring with External Sensors Outside a Robot

A range sensor, a camera, or the like installed outside a robot is used to measure the position or the posture of the robot within a measurement range.

It is difficult to accurately determine the position or the posture of a robot by a single sensor, so that there are cases where a plurality of the sensors or the measurement methods described above is used to determine the position or the posture from a plurality of obtained measurement results.

However, the plurality of measurement results cannot be easily compared for the following reasons.

The position and the posture measured in the above-described methods (2) and (3) are relative position and posture indicated by a coordinate system whose origin is a particular point or the sensor used for measurement. Each origin of measurement coordinates is different, and in the case of a sensor on a robot, the position of the robot itself that becomes the origin is unknown, thus making it difficult to compare the measurement results simply by coordinate conversion or the like.

The above-described method (1) is not intended to directly measure the position or the posture, so that direct comparison with the methods (2) and (3) is impossible.

Further, as will be described hereinafter, it is difficult to carry out measurement, synchronizing all sensor information.

Hence, there are cases where the measurement time of each obtained measurement result is different. Since the position and the posture of a robot change from moment to moment, the measurement results obtained at different time cannot be simply compared. This problem is apt to arise especially when the velocity of a robot is fast since the change amounts of the position and the posture are large.

a. In general, the sensor information of internal sensors in the same robot is acquired in synchronization. However, it is difficult, for example, to share one synchronization signal among different robots (wired connection being necessary). It is difficult, therefore, to synchronize the information of internal sensors among a plurality of robots.

b. In the case where external sensors are used, as in the method (3), it is also difficult to synchronize the external sensors and the sensors on the robot if synchronization signals are need to be transmitted and received among a plurality of devices, as in the case of "a".

c. The sensors used in the method (2) or (3) incur measurement delay due mainly to the measurement time of the sensors themselves or the time for processing the sensor information obtained from the sensors. Hence, the measurement results obtained by the sensors become old sensor information by the measurement delay, making the measurement time thereof different from the measurement time of the sensor information of the internal sensors as in the method (1). Further, there are cases where an object to be measured moves out of the fields of view of the sensors, so that the measurement results at specified time are not necessarily obtained at all times.

(In the Case of Handling a Moving Workpiece)

In an automated device adapted to handle a moving workpiece by a robot, it is necessary to measure the position of the workpiece by a visual sensor such as a camera, or a range sensor such as a laser range finder (LRF), installed on the robot or outside the robot, and then to carry out follow-up control on a robot arm according to the measurement results.

In the case where a robot itself moves, which is a mobile robot, the same technology is used since it is necessary to measure the position of the mobile robot by sensors installed on the robot or outside the robot and to control the robot on the basis of measurement results. Methods for measuring the position of the robot include a method for measuring the position relative to a landmark by a sensor on the robot, and a method for directly measuring the position of the robot by a sensor installed outside the robot, as described above.

In the following description, a moving workpiece or a mobile robot will be also referred to simply as "a mobile object" in some cases.

In the control for predicting the motion of the robot described above, the relative position between an object (a workpiece or a landmark) and the robot, which changes from moment to moment, is measured at a predetermined cycle (e.g., by a 30-fps camera), and a movement command to, for example, move the robot close to the workpiece, is output to the robot on the basis of the measurement results.

However, even when the robot is operated, aiming at the measured position of the workpiece, the robot possibly fails to follow the moving workpiece due to a control delay which includes a measurement delay of the sensor, a delay in acquiring data, and a motional delay of the robot.

Further, in the case of a visual sensor, the measurement cycle of the sensor is generally longer than a control cycle (e.g., 4 ms) of the robot. Therefore, the robot will not obtain the up-to-date measurement result in each control cycle, which leads to a measurement delay accordingly. Especially if image processing takes time or the workpiece moves out of the field of view of a camera, then the cycle in which the measurement result is updated is further prolonged and also becomes non-constant. Thus, devices handling a moving workpiece or a mobile robot cause a problem in that the follow-up performance of a robot deteriorates due to a control delay.

To solve the problem with the background art described above, various control means have already been proposed (e.g., Patent Literatures 1 to 4).

The "DEVICE FOR PREDICTING THREE-DIMENSIONAL MOTION" in Patent Literature (PLT) 1 is adapted to estimate motion parameters from the positional data of an object that performs simple harmonic motions, predict a future position thereof, and grasp the object by a manipulator on the basis of the positional information.

The "STATE ESTIMATION MEANS" in PLT 2 is adapted to estimate an internal state of a system which has performed observation, on the basis of observation signals input in time series by observation. The internal state means a state variable such as the position, the posture, and deflection angle of an object.

The "MOTION PREDICTION DEVICE" in PLT 3 combines background processing and foreground processing to carry out automatic tracking and motion prediction.

The "ROBOT DEVICE AND CONTROL METHOD THEREOF" in PLT 4 proposes a method in which an arm is first caused to follow an object, and a destination of the object is predicted by making use of the coincidence between the motion state of the arm at the time of the follow-up and the motion state of the object. Thus, predicting the destination of the object by considering the motion state of the arm enables the grasping of a mobile object.

CITATION LIST

Patent Literatures

PTL 1: Japanese Patent Application Laid-open Publication No. 07-019818
PTL 2: Japanese Patent No. 4072017
PTL 3: Japanese Patent No. 4153625
PTL 4: Japanese Patent No. 4265088

SUMMARY OF INVENTION

Technical Problem

According to PTL 1 mentioned above, the motion state of an object is estimated from the observation history of the measurement of the object (an object to be measured or a workpiece), thereby making it possible to complement data for time during which no measurement value has been obtained, or to predict a grasping point for the robot to grasp the object.

A Bayesian filter such as a Kalman filter or a particle filter is generally used to estimate the motion state. The Bayesian filter defines the state of a motion (the velocity, the acceleration, or the like of an object) as "an internal state,", also previously defines a "state transition model" indicating how the internal state changes with time, and then defines an "observation equation," as disclosed in PLT2.

The processing that implements the Bayesian filter is roughly divided into the following two types of processing.
(1) "Prediction processing" for predicting the internal state at arbitrary time.
(2) "Update processing" for revising the internal state by predicting a measurement value on the basis of the internal state and by comparing the predicted measurement value with an actual measurement value (described as "the filtering estimation means" in PTL2).

In the case where a robot uses a state estimation result for control, there are the following two possible configurations.

A. The afore-mentioned algorithm is installed in a robot controller, the prediction processing of the above-described processing (1) is carried out for each robot control cycle, and the update processing of the above-described processing (2) is carried out when a measurement value of a sensor is obtained.

B. As in PTL1, a system is constituted of a state estimation device and a robot, and the robot reads a prediction value from the estimation device and uses the prediction value for the control.

To control the motion of an automated machine such as a robot, it is required to calculate a control command value at a predetermined control cycle (e.g., a 4-ms cycle). Meanwhile, the prior arts have not proposed any specific methods that take a time limit into account in configuring a system using estimation of a motion state.

More specifically, a robot controller is influenced by the time required for processing to update a motion state (internal state), possibly making it difficult to calculate a control command value at a predetermined control cycle and to control the robot. For example, there are the following problems.

According to the means of the above-described configuration A, the update processing may not be finished within the control cycle of the robot. The update processing in the state estimation device generally takes time, and takes extra time especially in the case where many types of measurement values are involved or in the case where a particle filter or other complicated processing is involved.

Further, the means described in PTL2 is capable of reducing calculation amount in accordance with a purpose by separating the prediction processing and the update processing in accordance with the type of an observation value or a state variable. However, if a complicated motion is involved, or if all obtained measurement values are desired to be reflected, then every processing is eventually required to be combined, so that the calculation amount required for estimation will not be reduced.

Further, according to the method in the above-described configuration B, although the robot controller is not required to carry out the update processing, the estimation device is required, upon a request from the robot for a prediction value, to complete the prediction processing and supply a prediction value within predetermined time. When designing a state estimation device that would satisfy the requirement, it is necessary to take, for example, the following problems, into account.

(1) If the number of robots is considerably increased, or if the load of the update processing is high, then the arithmetic processing capability of the estimation device is distributed. Under such a condition, the prediction processing must be still completed within predetermined time.

(2) Each robot has a different robot control cycle, so that the time limit from the moment a request is issued from a robot to the moment a prediction value is supplied will not be uniquely determined.

(3) The communication between a robot controller and the state estimation device takes a predetermined time. The time required for communication differs in accordance with the communication system (wired, wireless or the like).

The problems described above may make it difficult to calculate a control command value at a determined control cycle so as to control a robot, as described above.

Therefore, an object of the present invention is to provide a motion prediction control device and method that can generate a control command value at a predetermined control cycle without being influenced by time required for the processing of updating an internal state in the case where an internal state of one or both of an object and a robot is estimated, and a prediction value (control command value) required for controlling a robot is generated on the basis of the estimated internal state.

Solution to Problem

According to the present invention, there is provided a motion prediction control device, comprising:

a measuring unit which acquires sensor information by measuring one or both of an object and a robot;

a state estimation unit which predicts and updates an internal state of one or both of the object and the robot on the basis of the sensor information;

a data storage unit which stores the internal state; and a robot control unit which controls the robot, wherein the state estimation unit updates the internal state at an arbitrary timing that is independent of a control cycle of the robot, and the robot control unit calculates, at the control cycle, a prediction value required for controlling the robot on the basis of a latest internal state stored in the data storage unit.

According to a first embodiment of the present invention, the measuring unit measures a relative relationship between the object and the robot as the sensor information, and the state estimation unit predicts and updates the internal state of the object or the robot, the state estimation unit includes an entire prediction section which predicts the internal state, and an updating section which updates the internal state stored in the data storage unit, and the robot control unit includes a prediction section on the robot that predicts, at the control cycle of the robot, the prediction value necessary for controlling the robot, (A) at an arbitrary timing that is independent of the control cycle, by the measuring unit, the state estimation unit, and the data storage unit, the relative relationship between the object and the robot is measured, the internal state of the object and/or the robot (one or both of the object and the robot) is predicted and updated, and the updated internal state and a state transition equation used for the prediction are stored, and (B) by the robot control unit, the prediction value is predicted at the control cycle on the basis of the latest internal state stored in the data storage unit, and the robot is controlled in real time on the basis of the prediction value.

The relative relationship between the object and the robot means the relative relationship between an object and a robot controlled by the robot control unit (e.g., a relative position, a relative posture, a relative velocity, a relative acceleration or a relative posture change), or the relative relationship between a robot controlled by the robot control unit and another robot (e.g., a relative position, a relative posture, a relative velocity, a relative acceleration or a relative posture change) (The same will apply hereinafter).

According to a second embodiment, the measuring unit acquires the sensor information on the object and/or a plurality of robots (specifically, an object and a plurality of robots, an object, a plurality of robots, or some of a plurality of robots) at an arbitrary timing that is independent of the control cycle or cycles of the robot or robots, the state estimation unit predicts, upon the acquisition of the sensor information, the internal state of each robot at the same time as the time when the sensor information is acquired, and compares the predicted internal state (e.g., sensor information converted from the predicted internal state by observation equation) with the measured sensor information to update the internal state, the data storage unit stores, upon the update, the updated internal state and the state transition equation used for the prediction, and a plurality of robot control units predicts prediction values necessary for the robots on the basis of the latest internal state stored in the data storage unit.

According to a third embodiment of the present invention, the robot is adapted to grasp an object that relatively moves, the measuring unit measures the position or the posture of the object as the sensor information, the state estimation unit updates the internal state of the object including an accuracy index value on the basis of a state transition model and an observation model from a measurement result of the measurement of the object, and determines whether or not the object can be grasped on the basis of the accuracy index value, and in the case where the object can be grasped, the robot control unit predicts the destination of the object on the basis of an update result of the internal state, and controls the robot so as to perform a grasping motion.

Further, according to the present invention, there is provided a motion prediction control method comprising the steps of:

(A) measuring one or both of an object and a robot by a measuring unit thereby to acquire sensor information;

(B) predicting an internal state of one or both of the object and the robot on the basis of the sensor information and updating the internal state by a state estimation unit;

(C) storing the internal state by a data storage unit; and (D) controlling the robot by a robot control unit, wherein at the step (B), the internal state is updated at an arbitrary timing that is independent of the control cycle of the robot by the state estimation unit, and at the step (D), a prediction value necessary for controlling the robot is calculated by the robot control unit at the control cycle on the basis of a latest internal state stored in the data storage unit.

According to the first embodiment of the present invention, the state estimation unit includes an entire prediction section that predicts the internal state, and an updating section that updates the internal state stored in the data storage unit, at the steps (A) to (C), at an arbitrary timing that is independent of the control cycle, by the measuring unit, the state estimation unit, and the data storage unit, the relative relationship between the object and the robot is measured as the sensor information, and the internal state of the object or the robot is predicted and updated, and the updated internal state and a state transition equation used for the prediction are stored, and an the step (D), by the robot control unit, at the control cycle, the prediction value is predicted on the basis of the latest internal state stored in the data storage unit, and the robot is controlled in real time.

According to the second embodiment of the present invention, at an arbitrary timing that is independent of the control cycle of the robot, at the step (A), sensor information on the object or a plurality of robots is acquired by the measuring unit, at the step (B), by the state estimation unit, the internal state of each robot at the same time as the time when the sensor information is acquired is predicted, the predicted internal state is compared with the sensor information to update the internal state, and at the step (C), the updated internal state and the state transition equation used for the prediction are stored by the data storage unit, and at the step (D), prediction values necessary for individual robots are predicted by a plurality of robot control units on the basis of the latest internal state stored in the data storage unit.

According to the third embodiment of the present invention, the robot is adapted to grasp an object that relatively moves, at the step (A), the position or the posture of the object is measured as the sensor information by the measuring unit, at the step (B), by the state estimation unit, the internal state of the object including an accuracy index value is updated from a measurement result of the measurement on the basis of a state transition model and an observation model, and whether the object can be grasped or not is determined on the basis of the accuracy index value, at the step (D), in the case where the object can be grasped, by the robot control unit, the destination of the object is predicted on the basis of an update result of the internal state, and the robot is caused to perform a grasping motion, and in the case where the object cannot be grasped, the steps (A) and (B) are repeated until the object becomes graspable.

Advantageous Effects of Invention

According to the present invention described above, the sensor information on one or both of the object and the robot is acquired at an arbitrary timing that is independent of the control cycle of the robot, and the internal state of one or both of the object and the robot is predicted and updated on the basis of the sensor information, thus eliminating the need for updating the internal state within the control cycle of the robot.

Further, at the control cycle, the prediction value is predicted on the basis of the latest internal state stored in the data storage unit, and the robot is controlled in real time, thus making it possible to calculate a prediction value necessary for controlling the robot (a control command value) at a predetermined control cycle to control the robot without being influenced by the calculation amount for estimating the state.

Therefore, the robot control unit can generate a control command value at a predetermined control cycle without being influenced by the time required for the processing of updating the internal state.

DESCRIPTION OF EMBODIMENTS

Figure 1:
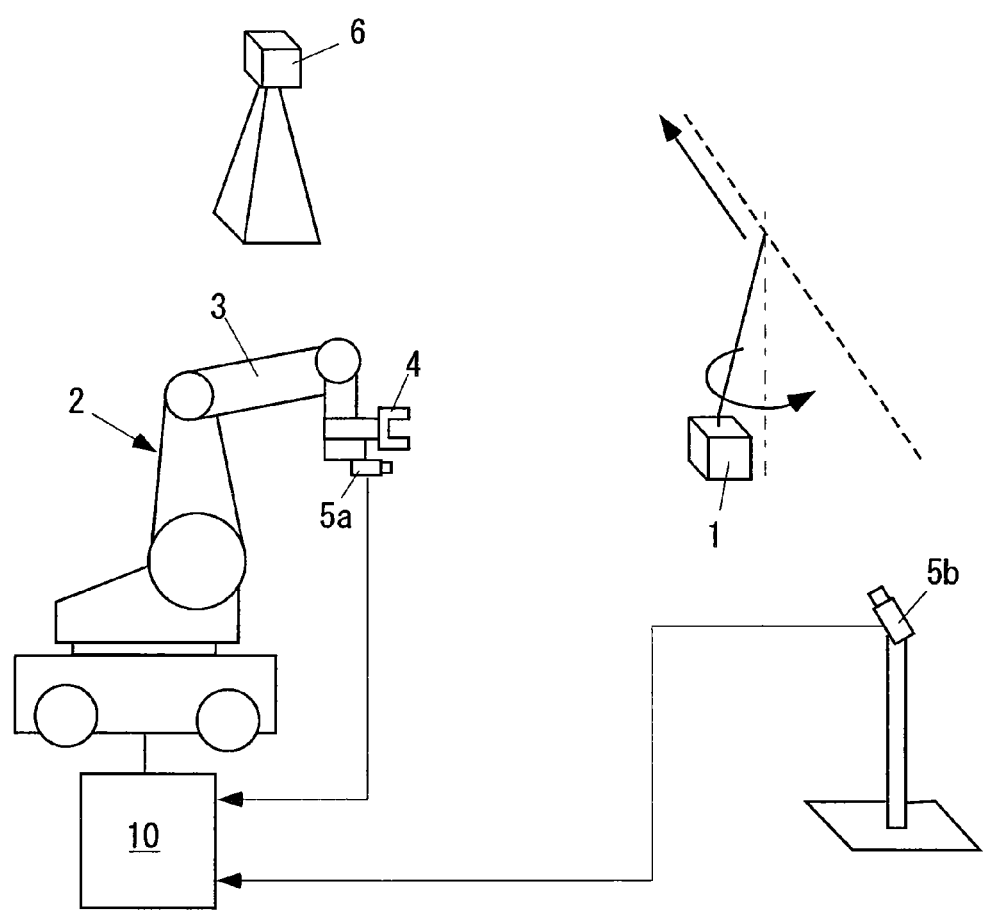
FIG. 1 is a diagram illustrating a first configuration example of a robot system provided with a motion prediction control device according to a first embodiment of the present invention.

In the following, preferred embodiments of the present invention will be described in detail with reference to the accompanying drawings. In the drawings, the common components will be denoted by the same reference signs, and overlapping description thereof will be omitted.

[First Embodiment of the Present Invention]

FIG. 1 illustrates a first configuration example of a robot system provided with a motion prediction control device according to a first embodiment of the present invention.

In the drawing, the reference sign 1 denotes a workpiece, the reference sign 2 denotes a movable robot, the reference sign 3 denotes a robot arm, the reference sign 4 denotes a hand, the reference sign 5a denotes a first camera secured to the hand 4, the reference sign 5b denotes a second camera secured at an external fixed position, the reference sign 6 denotes a fixed landmark, and the reference sign 10 denotes a motion prediction control device of the first embodiment. Hereinafter, the workpiece 1 and the landmark 6 will be both referred to as "the object."

The robot system is configured such that the workpiece 1 that moves while performing a pendular motion, or the fixed landmark 6 is measured by the cameras 5a and 5b, the robot 2 is measured by the camera 5b, and the robot 2 is controlled to follow the workpiece 1 to grasp the workpiece 1 by the hand 4. In this example, the position of the landmark 6 is not required to be known.

Figure 2:
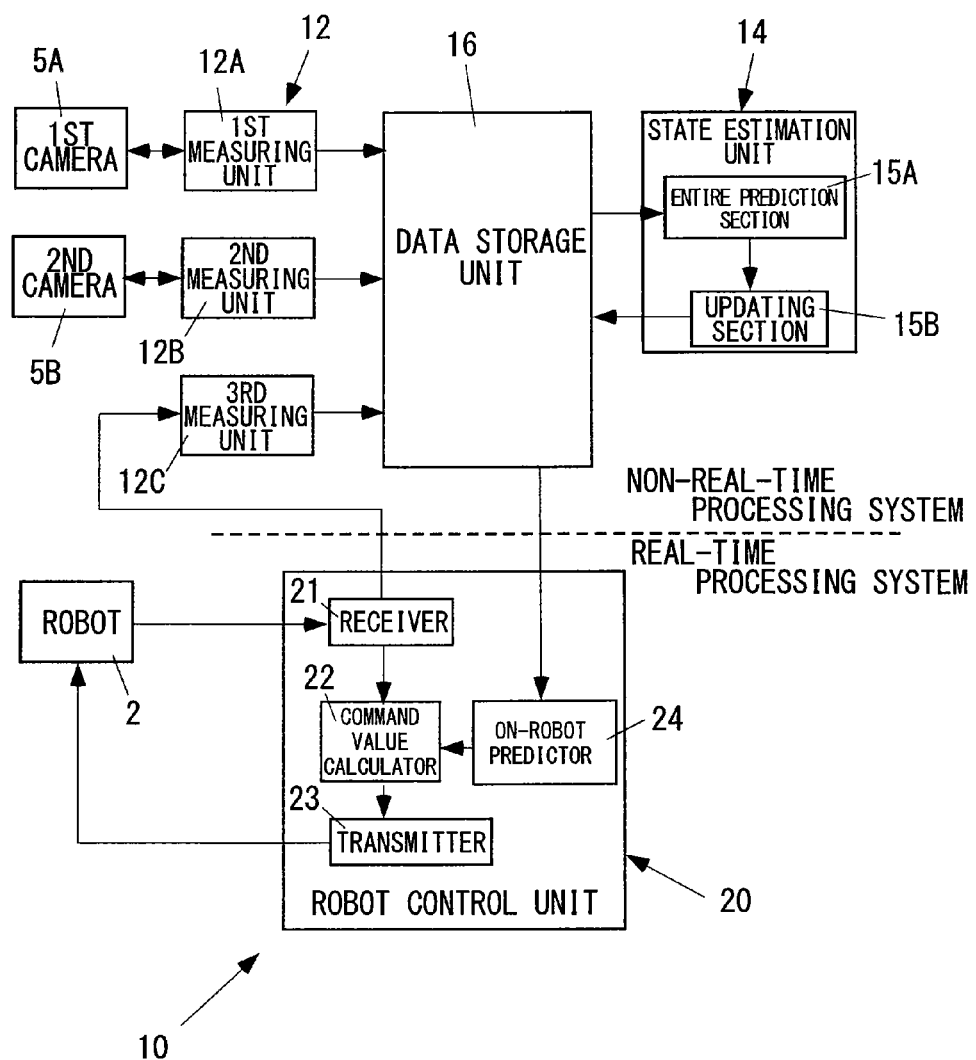
FIG. 2 is a diagram illustrating a first configuration example of the motion prediction control device according to the first embodiment of the present invention.

FIG. 2 illustrates a first configuration example of the motion prediction control device according to the first embodiment of the present invention.

In the drawing, the motion prediction control device 10 of the first embodiment includes a measuring unit 12, a state estimation unit 14, a data storage unit 16, and a robot control unit 20. The units 12, 14 and 20 are connected to the data storage unit 16.

The measuring unit 12 measures the relative relationship between an object and the robot 2. The measurement result of the relative position and posture between the object and the robot, for example, measured by the measuring unit 12 is denoted by a measurement value Y. Each measurement value Y is defined in accordance with the type of the measuring unit or an object to be measured. The measurement value Y depends on the object to be measured (the workpiece 1, the landmark 6, or the mobile robot 2) or the type of the measuring unit.

For example, the relative relationship is information including a position, a posture, a velocity, an angular velocity, acceleration, and angular acceleration.

The measuring unit 12 in this example is constituted by three measuring units (a first measuring unit 12a, a second measuring unit 12b, and a third measuring unit 12c) that are connected to the first camera 5a, the second camera 5b, and the robot control unit 20, respectively.

More specifically, in this example, two cameras and two measuring units are used as follows. An image of the object is obtained through the first camera 5a and the second camera 5b, and the measurement value Y of the object is determined by image processing. Further, the measuring unit 12b obtains also an image of the robot 2 to determine the measurement value Y of the robot 2 by image processing. The measuring unit 12c measures the movement amount of a tire of the robot 2 or the rotational amount of an arm joint by an encoder to determine the measurement value Y of the robot 2. The determined measurement values Y of one of or both of the object and the robot 2 are stored in the data storage unit 16.

The measuring unit 12 is not limited to the configuration described above, and may alternatively use a unit capable of measuring the relative relationship between the object and the robot 2 such as a laser radar, an acceleration sensor, a gyro sensor, and a velocity sensor.

A state estimation algorithm based on the algorithm of a Kalman filter is installed in the state estimation unit 14. According to this algorithm, all of state variables are referred to as an internal state X, together. These state variables include the deflection angle θ and Aθ of the pendulum by which the workpiece 1 is suspended, the positions of supporting points x, y and z of the pendulum, the positions X1, Y1 and Z1 of the landmark 6, the postures RX1, RY1 and RZ1 of the landmark 6, the positions Xr, Yr and Zr of the robot 2, and the postures thereof RXr, RYr and RZr of the robot 2.

Further, a state transition equation X (t+Δt)=f(X(t)) that indicates how the internal state X changes as time elapses, and an observation equation Y=h(X) that associates the internal state X with the measurement value Y are defined. The observation equation is defined for each type of the measurement value Y.

The algorithm also manages mainly an error distribution $C_{ov}X$ of the internal state X and an error distribution $C_{ov}Y$ of a measurement value. From these data, the accuracy of a state estimation can be determined. In the examples described below, the accuracy index values will be all denoted by E.

The state estimation unit 14 includes an entire prediction section 15a that predicts the internal state of one or both of the object and the robot 2, and an updating section 15b that updates the internal state stored in the data storage unit 16, to predict and update the internal state of one or both of the object and the robot 2.

The entire prediction section 15a carries out calculation to cause the internal state X recorded in the data storage unit 16 to proceed to specified time by using the state transition equation f(X).

The updating section 15b uses the internal state X in the data storage unit 16 and the observation equation h(X) to calculate a prediction value of the measurement value Y of one or both of the object and the robot 2. The input measurement value Y and the prediction value are compared with each other to update the internal state X, and the updated internal state X is recorded in the data storage unit 16. At this time, the accuracy index value E of the state estimation is also updated at the same time and recorded in the data storage unit 16.

The measuring unit 12, the state estimation unit 14, and the data storage unit 16 are non-real-time processing systems that work at different timings from the control cycle of the robot 2. The processing intervals of the non-real-time processing systems may be longer than the control cycle of the robot 2, and the cycle thereof may not be fixed. The processing interval is, for example, 30 to 80 ms.

Thus, according to the configuration described above, the relative relationship (e.g., the relative position and posture) of the object or the robot is measured by the measuring unit 12, the state estimation unit 14, and the data storage unit 16 at a different timing from the control cycle of the robot 2, the internal state of one or both of the object and the robot 2 is predicted and updated, and the updated internal state and the state transition equation used for the prediction are stored.

The robot control unit 20 in this example includes a receiver 21, a command value calculator 22, a transmitter 23, and an on-robot predictor 24.

The receiver 21 receives from the robot 2 the position information thereof (encoder information or the like).

The command value calculator 22 calculates a command value for the robot 2 on the basis of a prediction value supplied by the on-robot predictor 24. The prediction value is, for example, the present position or the future position of the workpiece 1 or the robot 2.

The transmitter 23 transmits a calculated command value to the robot 2.

The on-robot predictor 24 predicts, at a predetermined control cycle, a prediction value required for controlling the robot 2.

In other words, the robot control unit 20 includes the on-robot predictor 24 that carries out prediction processing (prediction) for obtaining a prediction value required to control the robot 2.

The on-robot predictor 24 has only to predict an internal amount (prediction value) related to the control of the robot 2 and does not have to predict all internal amounts.

The robot control unit 20 transmits a motion command to the robot 2 at a fixed cycle (e.g., 4 ms), and receives encoder information and the like of the robot 2. The received position information is acquired by the above-mentioned measuring unit 12c, and becomes the measurement value Y of the mobile robot 2.

The on-robot predictor 24 is used to predict the present and future motional states of one or both of the object and the robot 2, and the predicted motional states are used to calculate a command value.

The on-robot predictor 24 carries out calculation to shift the state amount that is related to the robot control and that is included in the internal state X recorded in the data storage unit 16, to specified time by using the state transition equation f(X).

The data storage unit 16 holds the data on the above-mentioned internal state X, model time tx of an internal state, the measurement value Y, measured time ty, the state transition equation f, the observation equation h, the accuracy index value E of a state estimation, and the like.

The robot control unit 20 described above is a real-time processing system controlled at the control cycle of the robot 2. The control cycle is a fixed cycle that is shorter than the processing interval of the above-mentioned non-real-time processing system. The control cycle is, for example, 3 to 4 ms.

Thus, in the configuration described above, from the latest internal state stored in the data storage unit 16, the robot control unit 20 predicts, at the control cycle of the robot 2, a prediction value necessary for the control so as to control the robot 2 in real time at the control cycle of the robot 2.

The following will explain the operation of the motion prediction control device 10 according to the first embodiment of the present invention.

The measuring unit 12 measures one or both of the object and the robot 2 at an arbitrary timing, and records the measurement result in the data storage unit 16 as sensor information.

When a new measurement result is recorded in the data storage unit 16, the state estimation unit 14 estimates the internal state by prediction processing and update processing (Correction). The calculated internal state, a state transition equation used for the estimation, and the like are recorded in the data storage unit 16.

The robot control unit 20 controls the robot 2 at a predetermined control cycle. At this time, the on-robot predictor 24 is used to calculate the predicted position of one or both of the object and the robot 2 at arbitrary time, and the predicted position is used for the control. The on-robot predictor 24 carries out the prediction processing by using the latest internal state and the state transition model recorded in the data storage unit 16.

The robot control unit 20 operates as a real-time processing system that carries out processing at a predetermined control cycle. The remaining units may be non-real-time processing systems that do not have time limits of fixed cycles.

The following will explain the operation of the motion prediction control device 10 according to the first embodiment described above.

The two measuring units (the first measuring unit 12a and the second measuring unit 12b) repeat the following steps (1) to (3) at an arbitrary timing.

(1) Transmitting a shutter signal to the cameras 5a and 5b at an arbitrary timing to acquire a captured image.

(2) Acquiring the position/posture information (the measurement value Y) of one or both of the object and the robot 2 from the acquired image by image processing. For example, a white area in the image is extracted to determine the center of gravity.

(3) Recording the calculated measurement value Y, the shutter time (measured time ty), and an error distribution $C_{ov}Y$ of the measurement value Y, in the data storage unit 16.

Further, the measuring unit 12c repeats the following steps (a1) to (a3) at an arbitrary timing.

(a1) Acquiring the encoder information of the robot control unit 20 at an arbitrary timing.

(a2) Determining the movement amount of a tire or a joint angle from the acquired encoder information to acquire the position/posture information (the measurement value Y) of the mobile robot 2.

(a3) Recording the calculated measurement value Y, the measured time of the encoder, and the error distribution $C_{ov}Y$ of the measurement value Y, in the data storage unit 16.

The state estimation unit 14 carries out the following steps (4) to (6) each time the measurement value Y is updated.

(4) Monitoring the data storage unit 16. If a new measurement value Y is found to have been recorded, then the information Y, ty, X, tx, f, h and E is read from the data storage unit 16.

(5) The internal state X indicates the internal state at time tx, so that the internal state at time ty is predicted by using the entire prediction section 15a.

(6) The updating section 15b is used to predict the measurement value at time ty, and the prediction value and the measurement value Y are compared with each other to revise the internal state X. The revised internal state X and the new model time tx (=ty) are recorded in the data storage unit 16. The updating section 15b calculates the error distribution $C_{ov}X$ of the internal state X and the accuracy index value E such as the difference between the measurement value and the prediction value, and records the calculation result in the data storage unit 16.

The robot control unit 20 repeats the following steps (7) to (10) at an arbitrary cycle.

(7) Receiving the encoder information or the like from the robot 2. The communication of the robot 2 is controlled by the robot 2 such that the communication is implemented at, for example, a 4-ms cycle. Hence, the robot control unit 20 must stand by until data is received, and complete the transmission processing of the step (10) within 4 ms from the reception of the data.

(8) Calculating the present position or the future position of the workpiece or the robot by using the on-robot predictor 24. To carry out the calculation, the on-robot predictor 24 refers to the latest internal state and the like in the data storage unit 16.

(9) Calculating a target trajectory such that the distal end of the arm approaches a predicted position of the workpiece 1. Further, if the accuracy index value E of a state estimation is assessed and if the state estimation is accurately implemented, then the target trajectory of the arm and a hand opening/closing command value are calculated so as to cause the arm to perform a grasping motion at the future position of the workpiece.

(10) Transmitting the calculated target trajectory and the hand opening/closing command value to the robot 2.

Figure 3:
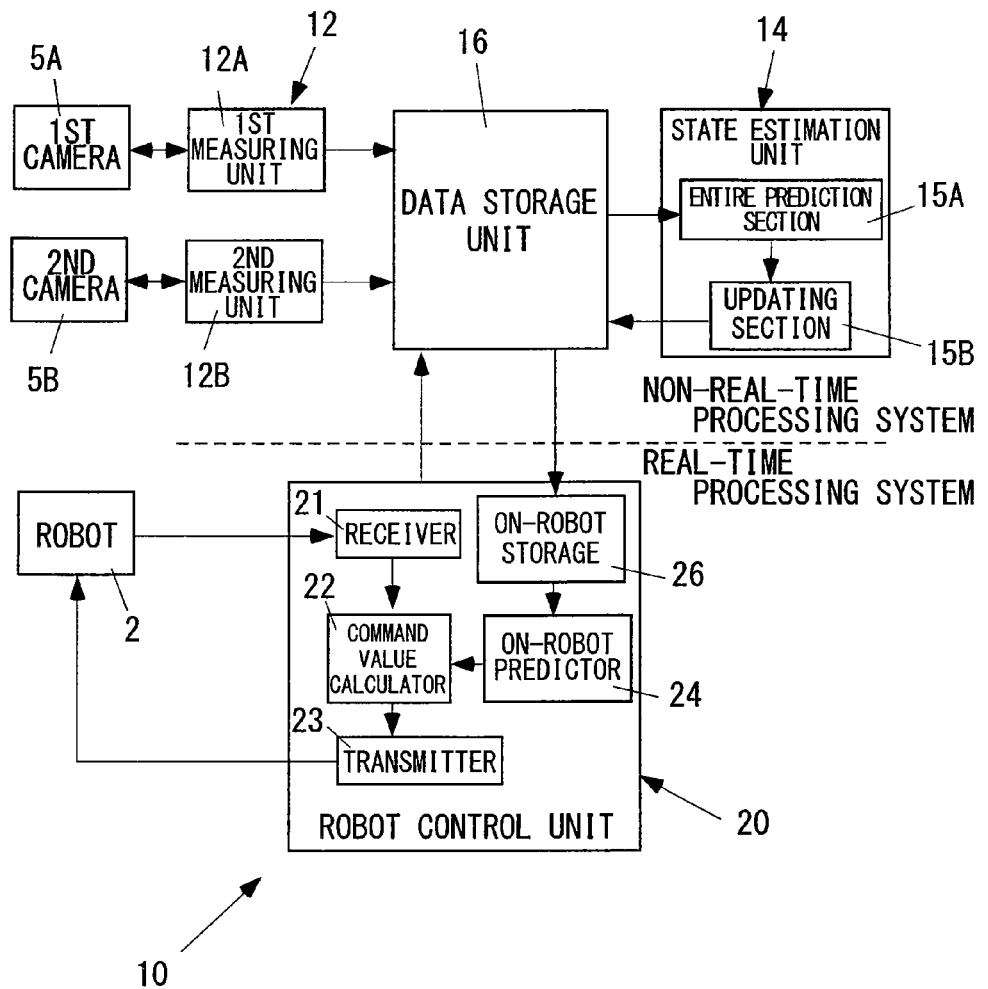
FIG. 3 is a diagram illustrating a second configuration example of the motion prediction control device according to the first embodiment of the present invention.

FIG. 3 illustrates a second configuration example of the motion prediction control device according to the first embodiment of the present invention.

This example is suitable for a case where the time required for the communication between the robot control unit 20 and the data storage unit 16 is long.

More specifically, in this example, the data storage unit 16 has a function for transferring the latest internal state stored in the data storage unit 16 to an on-robot storage 26 at a timing that is independent of a request from the robot 2.

By the configuration described above, the data storage unit 16 transfers the internal state and the state transition model recorded in the data storage unit 16 to the on-robot storage 26. The on-robot predictor 24 carries out processing by referring to the data in the on-robot storage 26.

The transfer timing is preferably the moment when the internal state X of the data storage unit 16 is updated (immediately after the step (6)).

This data transfer is performed upon detection of new data having been recorded in the data storage unit 16 (immediately after step (6)) or at fixed time intervals. Alternatively, this data transfer may be performed at both of the above-mentioned timings.

By the configuration, the contents of the data storage unit 16 are sequentially transferred to the on-robot storage 26, and the on-robot predictor 24 refers to the on-robot storage 26, thus eliminating the need for communication for the calculation of the step (8). This makes it possible to obviate the influences of communication time even when the communication requiring long time, such as wireless communication, is used.

Figure 4:
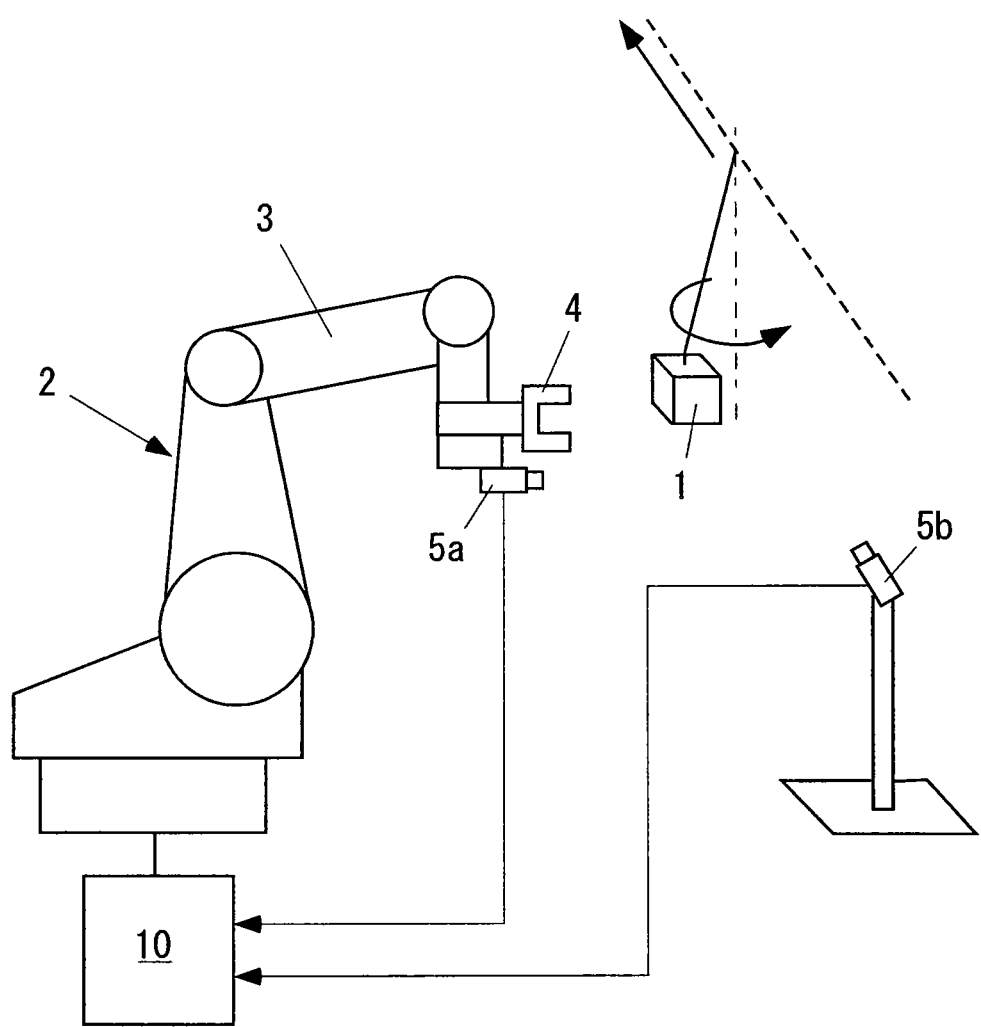
FIG. 4 is a diagram illustrating a second configuration example of a robot system provided with the motion prediction control device according to the first embodiment of the present invention.

FIG. 4 illustrates a second configuration example of a robot system provided with a motion prediction control device according to the first embodiment.

This example differs from the first configuration example of the robot system in that the robot 2 is fixed and the landmark 6 is not included. The rest of the configuration is the same as the first configuration example.

More specifically, this example illustrates a case where the moving workpiece 1 is grasped by the arm 3 of the robot 2 that is fixed, and differs from the first configuration example of the robot system in the aspect that no estimation related to the robot 2 is required.

Figure 5:
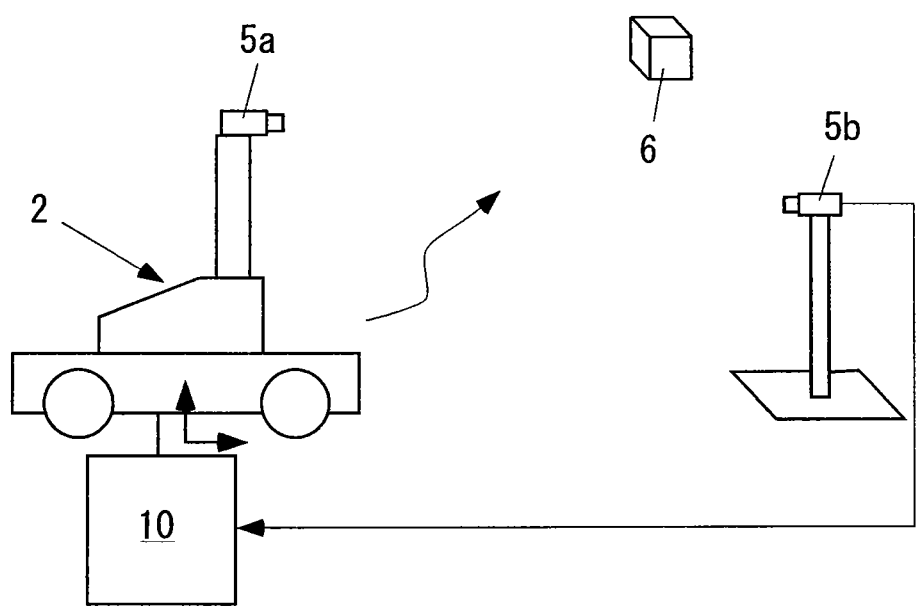
FIG. 5 is a diagram illustrating a third configuration example of a robot system provided with the motion prediction control device according to the first embodiment of the present invention.

FIG. 5 illustrates a third configuration example of the robot system provided with the motion prediction control device according to the first embodiment.

This example illustrates a case where the robot 2 estimates its own position from the landmark 6 of which position is known, and the example differs from the first configuration example in that there is no need to perform estimations related to a workpiece and the estimations of the position and posture of the landmark 6.

This example illustrates a case where the mobile robot 2 measures the landmark 6 of which position is known, to estimate its own position of the robot 2. In this example, the internal amounts X to be estimated are the its own position $(X_r, Y_r, Z_r)$ of the robot 2 and the posture $(R_{xr}, R_{yr}, R_{zr})$ of the robot 2. In addition, the steering angle, the velocity, the angular velocity, and the like of a wheel may be estimated.

The result of the measurement of the landmark 6 by the camera 5a, the result of the measurement of the position of the robot 2 by the camera 5b, the rotational amount (θ) of the wheel recorded by the robot control unit 20, and the like are included in the measurement values used in the update processing.

The remaining aspects of the third configuration example of the robot system may be the same as the first configuration example of the robot system.

The first embodiment of the present invention is not limited to the configuration examples described above.

For example, also in a case where a plurality of robots and workpieces is involved, the estimation of the motional states of the workpieces and the estimation of the motional states of the robots are combined, thus making it possible to achieve a system that takes the time limits in the robot control into account by the first embodiment described above.

In the above-mentioned practical examples, the workpiece that performs a pendular motion and the wheeled mobile robot are shown. However, the mode of movement is not limited thereto. For example, the workpiece may move on a conveyor, float on water or fly. The robot may be a crawler type or a type that travels on a rail. Further, the "movement" of the fixed arm includes a case where the base thereof shakes or passively moves.

Further, the units do not have to be divided into separate processing units. For example, a plurality of programs such as a measurement program and a state estimation program may be concurrently run on a single personal computer.

However, the robot control unit (program) is a real-time processing system that carries out processing under the limitation of a fixed cycle. A real-time operating system (OS) allows a program for non-real-time processing and a program for real-time processing to be concurrently run.

The data storage unit 16 may be any memory as long as it is a shared memory from which the same data is read by a plurality of units or programs and to which the same data is written by a plurality of units or programs. This obviates the need to set the data storage unit 16 as an independent unit. The data storage unit 16 may be prepared in a memory space of the state estimation unit 14 or the measuring unit 12.

According to the devices and the methods of the first embodiment described above, the measuring unit 12, the state estimation unit 14, and the data storage unit 16 measure the relative relationship between an object and a robot (e.g., a relative position), predict and update the internal state of one or both of the object and the robot, and store the updated internal state and the state transition equation used for the prediction. This allows the movement of a mobile body (a workpiece or a mobile robot) to be predicted on the basis of a measurement result of the relative relationship (e.g., a position or a posture) between the object (a workpiece or a landmark) and the robot.

Further, the robot control unit 20 includes the on-robot predictor 24 that predicts a prediction value necessary for controlling the robot 2 at the control cycle of the robot 2 to predict the prediction value at the control cycle on the basis of the latest internal state stored in the data storage unit 16, and control the robot 2 in real time. This allows a control command value to be calculated at a control cycle determined each robot without being influenced by the calculation amount of a state estimation, thereby controlling the robot 2.

In other words, the robot control unit 20 can operate without being subjected to the influence of time required for the update processing of the state estimation.

Even if the calculation amount of the state estimation increases as the number of the measuring units 12 and the robot control units 20 increases, each robot control unit 20 independently carries out the prediction calculation, so that the time required for the prediction processing will not be increased. This obviates the need for reviewing the design of an arithmetic processing capability and the like when changing the system.

Further, the time limit of the prediction processing can be set for each robot control unit 20. In addition, the accuracy of a prediction value to be calculated, the type of a prediction value, and the like can be also set for each robot control unit 20. Hence, ingenuities such as changing the accuracy of the prediction calculation or calculating only a necessary variable in an internal state can be implemented in each robot 2 by taking into account the time required for the prediction processing, the control cycle, and the like.

Further, the data storage unit 16 transfers the latest internal state stored in the data storage unit 16 to the on-robot storage 26 at a timing that does not depend on a request from the robot 2, thus permitting prompt reference to data required for the prediction processing in the case where the communication between the robot control unit 20 and the state estimation unit 14 takes time or in the case where the time required for the communication is not consistent. In this case, the prediction processing can be completed within predetermined time although the data referred to on the robot 2 is not necessarily the latest value due to the influence of a communication delay.

It is to be understood that the first embodiment is not limited to the configuration examples described above, and includes all modifications which are indicated by the appended claims and which come within the meaning and range of equivalency of the claims.

[Second Embodiment of the Present Invention]

Figure 6:
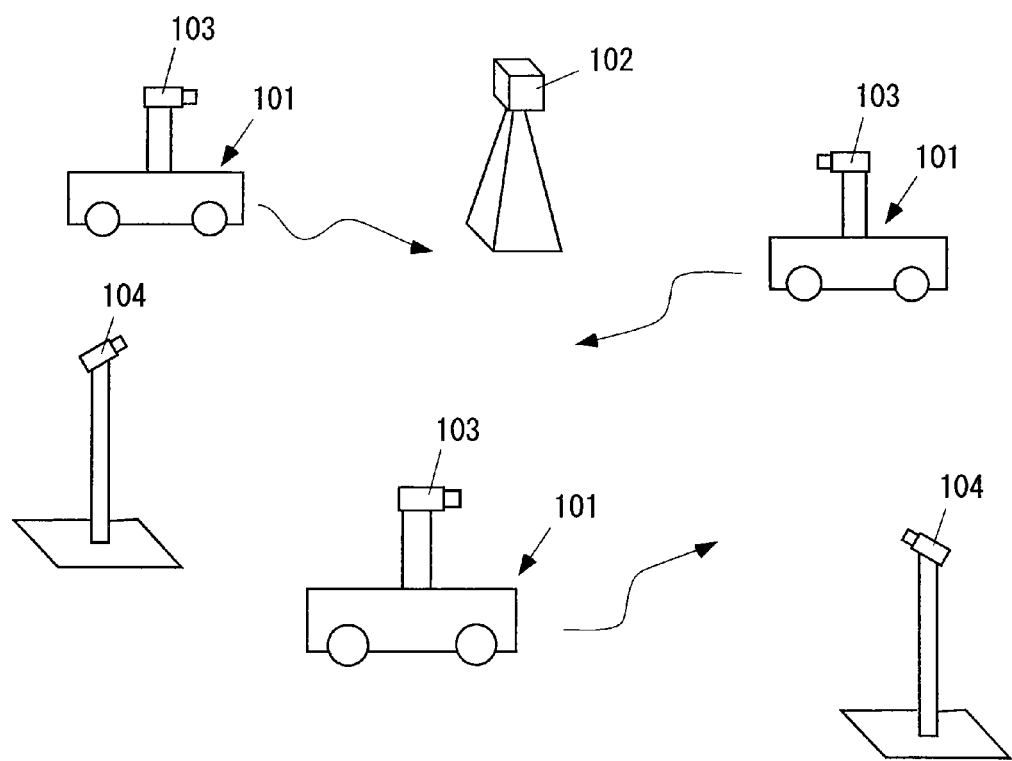
FIG. 6 is a schematic diagram of a robot system provided with a motion prediction control device according to a second embodiment of the present invention.

FIG. 6 is a schematic diagram illustrating a robot system provided with a motion prediction control device according to a second embodiment of the present invention.

In the drawing, the reference sign 101 denotes a mobile robot, the reference sign 102 denotes a landmark fixed outside the mobile robot 101, the reference sign 103 denotes an internal sensor secured to the mobile robot 101, and the reference sign 104 denotes an external sensor fixed outside the mobile robot 101.

In this system, each of a plurality of mobile robots 101 is adapted to autonomously travel.

Hereinafter, the mobile robot will be referred to simply as "the robot" in the second embodiment.

Figure 7:
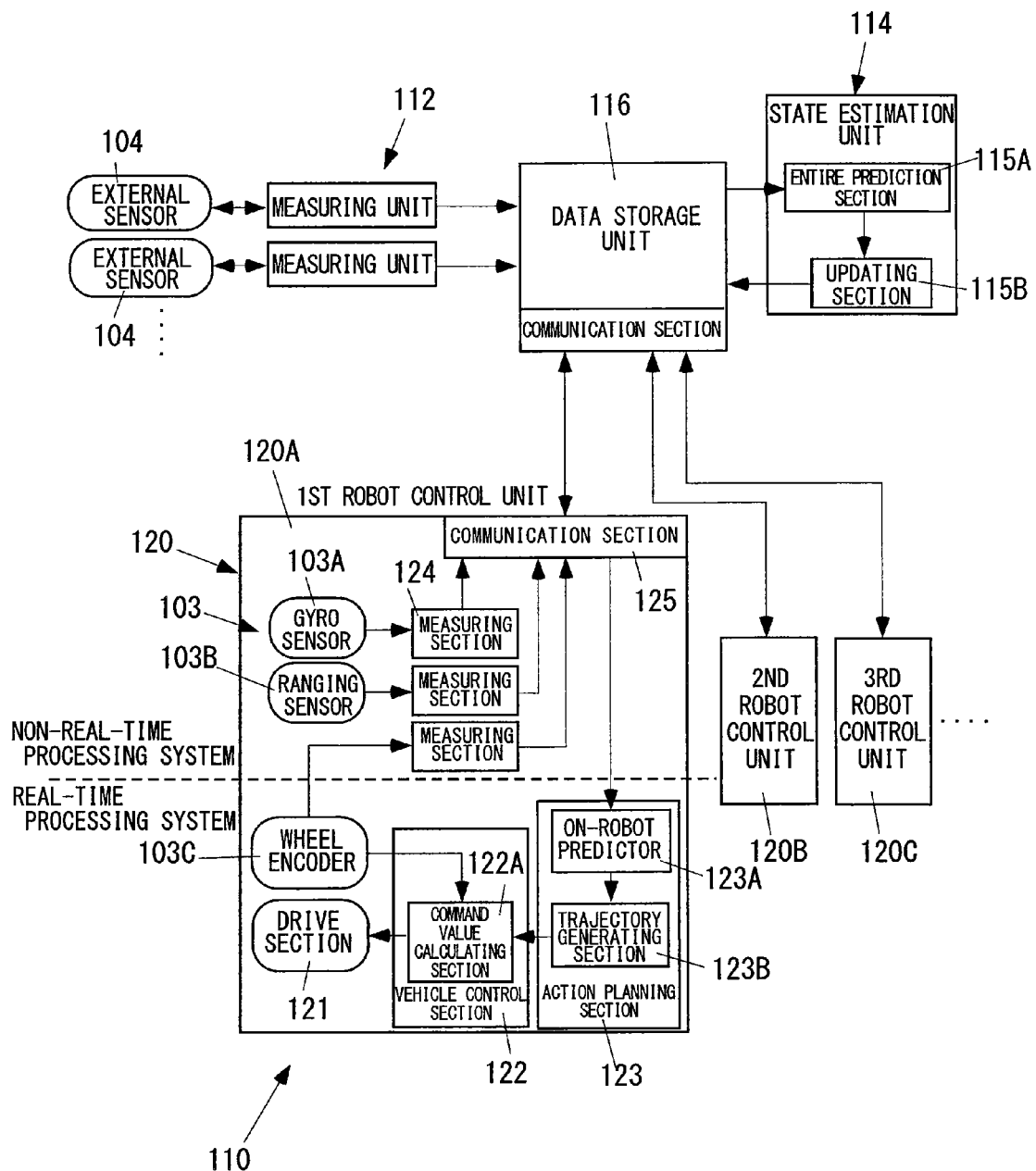
FIG. 7 is a diagram illustrating a first configuration example of the motion prediction control device according to the second embodiment of the present invention.

FIG. 7 illustrates a first configuration example of the motion prediction control device according to the second embodiment of the present invention.

In the drawing, a motion prediction control device 110 of the second embodiment includes a measuring unit 112, a state estimation unit 114, a data storage unit 116, and a plurality of robot control units 120. The units 112, 114, and 120 are all directly connected to the data storage unit 116.

The plurality of robot control units 120 in this example includes a first robot control unit 120A, a second robot control unit 120B, and a third robot control unit 120C.

In this example, there are three robot control units 120. However, there may be two or four or more robot control units 120.

The measuring unit 112 is connected to the corresponding external sensor 104 to obtain sensor information (observation values) of the external sensor 104. The external sensor 104 may be a camera, a laser range finder (LRF), a three-dimensional laser radar, a gyro sensor, a GPS compass, a pulse encoder, or the like.

The measuring unit 112 reads sensor information from the external sensor 104 at an arbitrary timing, and carries out measurement processing (the steps(1) to (3) of the operation) that will be discussed later.

A measuring section 124 on the robot control unit 120 has the same function as that of the measuring unit 112. Further, in this example, the unit that has no processor for travel mechanism or drive control in the configuration of the robot control unit 120, which will be discussed later, will be referred to as "the measuring unit 112."

A state estimation algorithm based on the algorithm of a Kalman filter is installed in the state estimation unit 114. The algorithm defines all state variables, including a position x, y, z, a velocity vx, vy, vz, and an angular velocity drx, dry, drz of the robot 101, as an internal state X.

Further, a state transition equation X (t+Δt)=f(X(t)) that indicates how the internal state X changes as time elapses, and an observation equation Y=h(X) that associates the internal state X with an observation value Y, are defined. The observation equation is defined for each type of the observation value Y (sensor information).

The algorithm also manages mainly an error distribution $C_{ov}X$ of the internal state X and an error distribution $C_{ov}Y$ of the observation value Y. From these data, the accuracy of a state estimation can be determined. In the examples described below, the accuracy index values will be denoted by E, together.

The state estimation unit 114 includes two functions, namely, an entire prediction section 115a and an updating section 115b.

The entire prediction section 115a carries out calculation to cause the internal state X recorded in the data storage unit 116 to proceed to specified time by using the state transition equation f(X).

The updating section 115b calculates the prediction value of the observation value Y of an object (the robot 101 or the landmark 102) by using the internal state that has been proceeded to the measurement time by the entire prediction section 115a, and by using the observation equation h(X). The input observation value Y and the prediction value are compared with each other to update the internal state X, and the updated internal state X is recorded in the data storage unit 116. At this time, the accuracy index E of the state estimation is also updated at the same time, and recorded in the data storage unit 116.

The robot control unit 120 in FIG. 7 represents a configuration used for a typical robot 101.

In the drawing, the robot control unit 120 includes a drive section 121 for traveling, a vehicle control section 122 that controls the drive section 121, an action planning section 123 that calculates a target trajectory of the robot 101, and a measuring section 124 that carries out the sensor processing of each of the sensors 103.

The sensor 103 mainly includes a gyro sensor 103a that measures the angular velocity or the acceleration of the robot 101, a range sensor 103b (LRF) that measures a surrounding shape, and a wheel encoder 103c that measures the rotational amount of a wheel provided in the robot 101.

Figure 8:
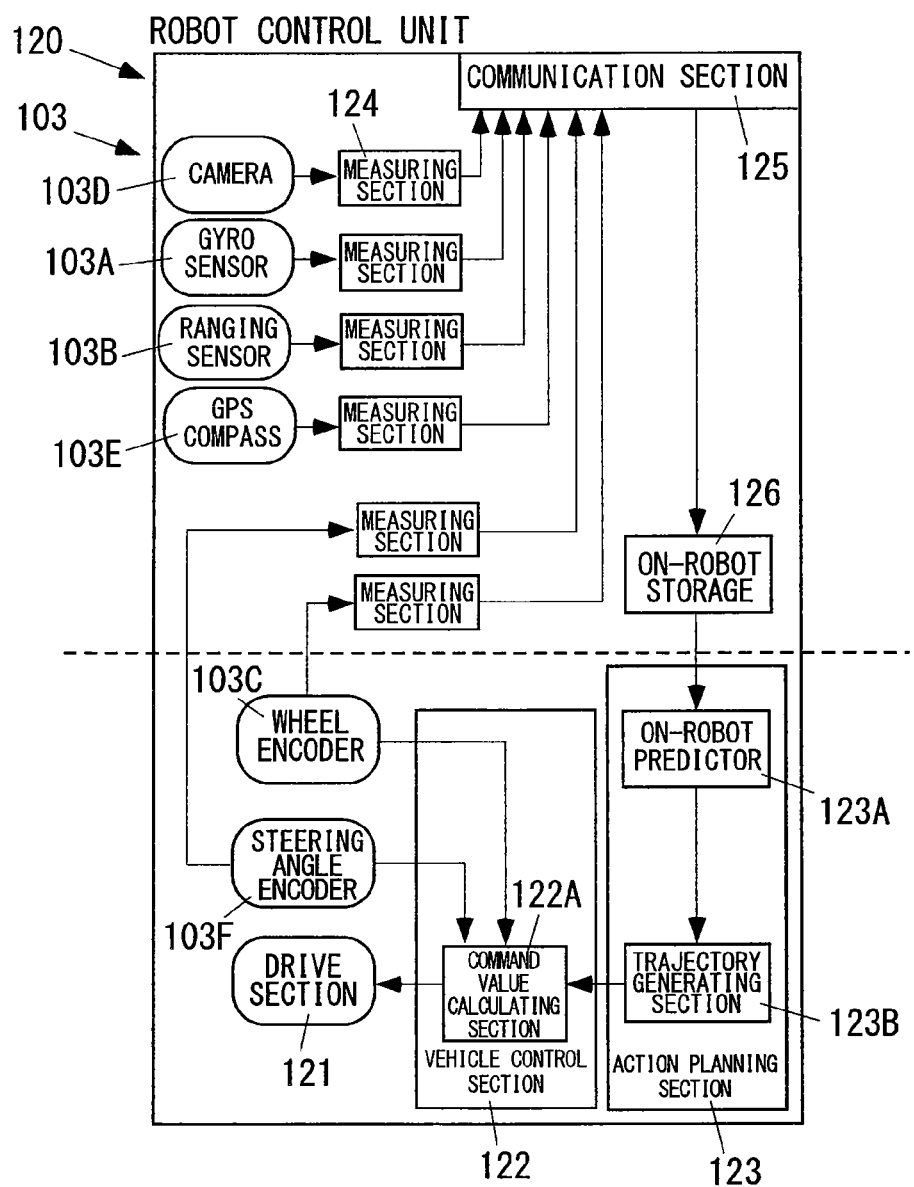
FIG. 8 is a diagram illustrating a second configuration example of the motion prediction control device according to the second embodiment of the present invention.

FIG. 8 illustrates a second configuration example of the motion prediction control device according to the second embodiment of the present invention. In this drawing, only the robot control unit 120 is shown.

In the second embodiment, the type of the sensors 103 is not limited. More specifically, for example, sensors such as a camera 103d, a GPS compass 103e, and a steering angle encoder 103f for measuring the steering angle of a wheel provided in the robot 101 may be added, as illustrated in FIG. 8, or some of the sensors may not be used in the configuration. The remaining aspects of the second configuration example of the motion prediction control device may be the same as the first configuration example of the motion prediction control device.

In FIG. 7 and FIG. 8, the action planning section 123 is a real-time processing system that operates at a fixed control cycle, and predicts the present or future position or posture of the self robot 101 by using an on-robot predictor 123a, the predicted position or posture being used to calculate a target trajectory of the robot 101 by a trajectory generating section 123b. Further, if necessary, the present or future position and posture of another robot 101 is predicted to, for example, avoid a collision.

The on-robot predictor 123a carries out calculation for causing a state amount that is related to robot control and that is included in the internal state X recorded in the data storage unit 116, to proceed to specified time by using the state transition equation f(X). The on-robot predictor 123a is designed to be capable of performing prediction processing under the time limit of real-time control.

The vehicle control section 122 is a real-time processing system operating at a predetermined control cycle, calculates a command value by a command value calculating section 122a, and controls the drive section 121 such that the robot 101 moves along a target trajectory.

A communication section 125 has a function for data communication between the robot 101 (i.e., the robot control unit 120 provided in the robot 101) and the data storage unit 116. More specifically, a device adapted to perform wired communication such as Ethernet (registered trademark) or USB, or a device adapted to perform wireless communication such as Bluetooth or wireless LAN is used.

The data storage unit 116 holds data including the internal state X, the internal state model time tx, the observation value Y, the measurement time ty, the state transition equation f, the observation equation h, and the state estimation accuracy index value E.

The following will explain the operation of the motion prediction control device 110 according to the second embodiment of the present invention described above.

The measuring unit 112 or the measuring section 124 repeats the following steps (1) to (3) at an arbitrary timing.

(1) Acquiring sensor information at an arbitrary timing. For example, in the case of a camera, a shutter signal is transmitted to the camera to acquire a captured image.

(2) Processing the acquired sensor information to determine the observation values Y such as the positions and the postures of the robot 101 and the landmark 102, and the velocity or the angular velocity of the robot 101. The observation values Y are each defined for each sensor, because the observation values Y are different for each sensor. Further, the processing of the sensor information carried out in this case varies depending on the type of sensor. For example, in the case of a camera, the sensor information on the position and the posture of the object (the robot 101 or the landmark 102) is acquired from an acquired image by the image processing (e.g., a white area in the image is extracted to determine the center of gravity). Further, in the case of, for example, a pulse encoder, the processing for counting pulsed waves is conceivable.

(3) Recording the calculated observation values Y, the measurement time ty (shutter time or the like), and the error distribution $C_{ov}Y$ of the observation value Y, in the data storage unit 116.

Further, the state estimation unit 114 carries out the following steps (4) to (6) each time the observation value Y is updated.

(4) Monitoring the data storage unit 116. If a new observation value Y is found to have been recorded, then the data Y, ty, X, tx, f, h and E are read from the data storage unit 116.

(5) The internal state X indicates the internal state at time tx, so that the internal state at time ty is predicted by using the entire prediction section 115a.

(6) The updating section 115b is used to predict the observation value at time ty from the internal state predicted in the step (5), and the prediction value and the observation value Y are compared with each other to revise (update) the internal state X. The revised internal state X and the new model time tx (=ty) are recorded in the data storage unit 116. The updating section 115b calculates the error distribution $C_{ov}X$ of the internal state X and the accuracy index value E such as the magnitude of the difference between the observation value and the prediction value, and records the calculation result in the data storage unit 116.

The action planning section 123 on the robot control unit 120 repeats the following steps (7) and (8) at a predetermined cycle.

(7) Calculating the present position or the future position of the self robot 101 by using an on-robot predictor 123a. Further, if necessary, the present position or the future position of another robot 101 is calculated to avoid a collision or the like.

(8) Generating a target trajectory to cause the self robot 101 to move to a target position.

The vehicle control section 122 on the robot control unit 120 repeats the following steps (9) to (11) at a predetermined cycle.

(9) Determining the current velocity of the self robot 101 from the wheel encoder 103c.

(10) Calculating a control command value that leads to a motion along the target trajectory generated by the action planning section 123.

(11) Transmitting the calculated control command value to the drive section 121.

Accurately controlling the drive section 121 requires that the vehicle control section 122 calculate control command values at a fixed cycle. Further, the target trajectory referred to by the vehicle control section 122 must be generated beforehand by the action planning section 123. Hence, the processing by the action planning section 123 and the vehicle control section 122 is real-time processing repeated at a fixed cycle.

In general, the control cycle of the action planning section 123 is longer than the control cycle of the vehicle control section 122 (depending on the length of a target trajectory generated at a time). Further, a target trajectory includes a general travel path to a target point in addition to an immediate travel path referred to by the vehicle control section 122. Hence, in some cases, the processing by the action planning section 123 is further divided into two or more parts for generating a local path, generating a global path, and generating a more global path, for example. In this case, the processing for generating the local path will have a shorter control cycle. For the global paths, the processing may have a long control cycle or may be non-real-time processing with no constant cycle.

Figure 9:
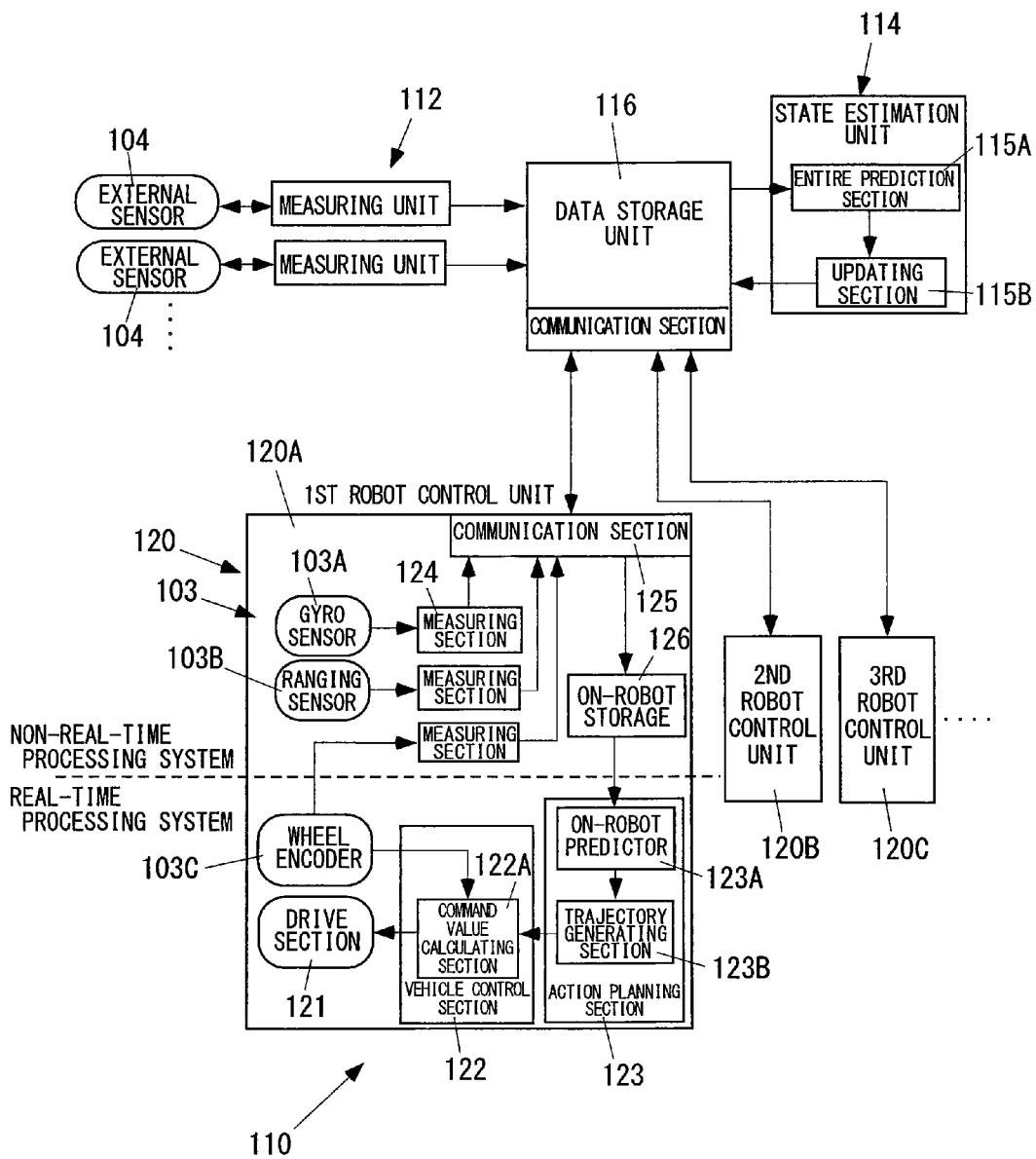
FIG. 9 is a diagram illustrating a third configuration example of the motion prediction control device according to the second embodiment of the present invention.

FIG. 9 illustrates a third configuration example of the motion prediction control device according to the second embodiment of the present invention. In this example, the robot control unit 120 is further provided with an on-robot storage 126.

When the calculation in the step (7) described above is carried out, the on-robot predictor 123a refers to the latest internal state X in the data storage unit 116. At this time, communication takes time, so that a prediction value may not be determined under a predetermined time limit. In this example, therefore, the contents of the data storage unit 116 are sequentially transferred to the on-robot storage 126, and the on-robot predictor 123a refers to the on-robot storage 126. The transfer timing is the moment the internal state X in the data storage unit 116 is updated (immediately after the step (6) described above).

The second robot control unit 120B and the third robot control unit 120C also include the on-robot predictor 123a, the on-robot storage 126 and the like, as with the first robot control unit 120A.

Although the number of the robot control units 120 is three in this example, the number may alternatively be two or four or more.

In the third configuration example of the motion prediction control device, the remaining aspects may be the same as the first configuration example or the second configuration example of the motion prediction control device.

Figure 10:
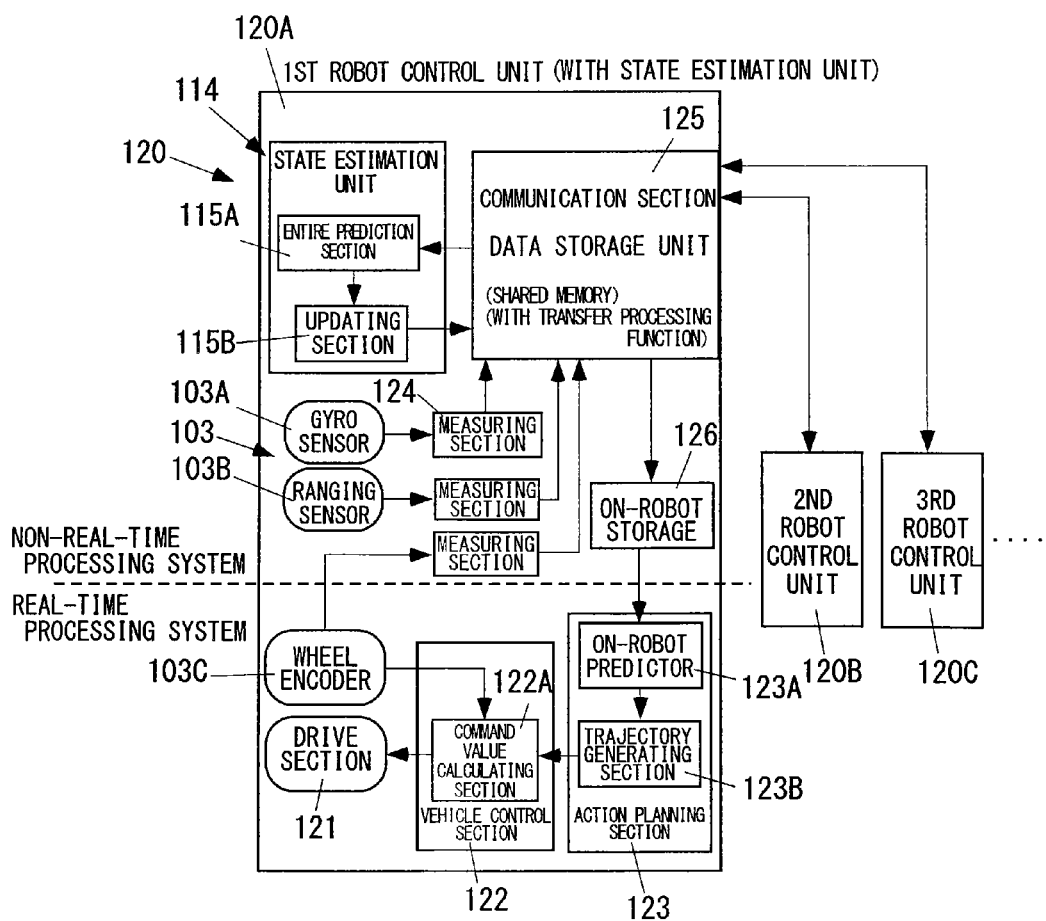
FIG. 10 is a diagram illustrating a fourth configuration example of the motion prediction control device according to the second embodiment of the present invention.

FIG. 10 illustrates a fourth configuration example of the motion prediction control unit according to the second embodiment of the present invention. This drawing illustrates only the robot control unit 120.

In the examples described above, for the sake of explanation, the expression "the measuring unit 112" is used. The measuring unit 112 is provided in the robot control unit 120 (i.e., the robot 101) that does not include a travel mechanism, and handled as a type of the robot control unit 120.

Thus, the system configuration in the second embodiment of the present invention includes two types, namely, the state estimation unit 114 and the robot control unit 120, and the robot control unit 120 (the robot 101) includes one that does not include a travel mechanism.

The data storage unit 116 may be any memory as long as it is a shared memory from which the same data is read by a plurality of units or programs and to which the same data is written by a plurality of units or programs. This obviates the need to set the data storage unit 116 as an independent unit. Instead, the data storage unit 116 may be prepared in a memory space of the communication section 125 or the state estimation unit 114 or the like, as illustrated in FIG. 10.

Further, the state estimation unit 114 may be configured to be installed in one of the robots 101, and combined with the robot control unit 120 as illustrated in FIG. 10. For example, a plurality of programs can be concurrently run on a single personal computer as a state estimation program and a robot control program.

In the fourth configuration example of the motion prediction control device, the remaining aspects may be the same as the first configuration example, the second configuration example, or the third configuration example of the motion prediction control device.

In the examples described above, the prediction values calculated by the on-robot predictor 123*a* are used to control the robot 101. In addition, a person or an object around the robot 101 can be measured by the robot 101, and the information on the position or the motion of the person or the object around the robot 101 can be predicted by the on-robot predictor 123*a* so as to present the information to people, thus providing a service of presentation of changing information in real time.

According to the devices and the methods of the second embodiment described above, the measuring unit 112, the state estimation unit 114, and the data storage unit 116 acquire the sensor information of an object and/or the plurality of robots 101 at an arbitrary timing that is not dependent on the control cycle of the robots 101, predict the internal state X of each of the robots 101 of the same time as the time when the sensor information is acquired, compare the predicted internal state with the sensor information, update the internal state X, and store the updated internal state X and the state transition equation f(X) used for the prediction. This allows the motion of each of the robots 101 to be predicted on the basis of the sensor information on an object (e.g., the landmark 102) or the robots 101 (e.g., the position or the posture).

Further, a plurality of robot control units 120 predicts the prediction value required for each of the robots 101 on the basis of the latest internal state X stored in the data storage unit 116. This allows a control command value to be calculated at a control cycle determined for each of the robots 101 without being influenced by the calculation amount of a state estimation, thereby controlling a plurality of the robots 101.

In other words, each of the robot control units 120 can operate without being subjected to the influence of time required for the update processing of the state estimation.

Even if the calculation amount of the state estimation increases as the number of the measuring units 112 and the robot control units 120 increases, each of the robot control units 120 independently carries out the prediction calculation, so that the time required for the prediction processing will not be increased. This obviates the need for reviewing the design of an arithmetic processing capability and the like when changing the system.

Further, the time limit of the prediction processing can be set for each of the robot control units 120. In addition, the accuracy of a prediction value to be calculated, the type of a prediction value, and the like can be also set for each of the robot control units 120. Hence, ingenuities such as changing the accuracy of the prediction calculation or calculating only a necessary variable in the internal state X, by taking into account the time required for the prediction processing, the control cycle and the like can be implemented in each of the robots 101.

Further, the data storage unit 116 transfers the latest internal state X stored in the data storage unit 116 to the on-robot storage 126 at a timing that does not depend on a request from the robot 101, thus permitting prompt reference to data required for the prediction processing in the case where the communication between the robot control unit 120 and the state estimation unit 114 takes time or in the case where the time required for the communication is not constant. In this case, the prediction processing can be completed within predetermined time although the data referred to on the robot is not necessarily the latest value due to the influence of a communication delay.

It is to be understood that the second embodiment of the present invention is not limited to the configuration examples described above, and includes all modifications which are indicated by the appended claims and which come within the meaning and range of equivalency of the claims.

[Third Embodiment of the Present Invention]

Figure 11:
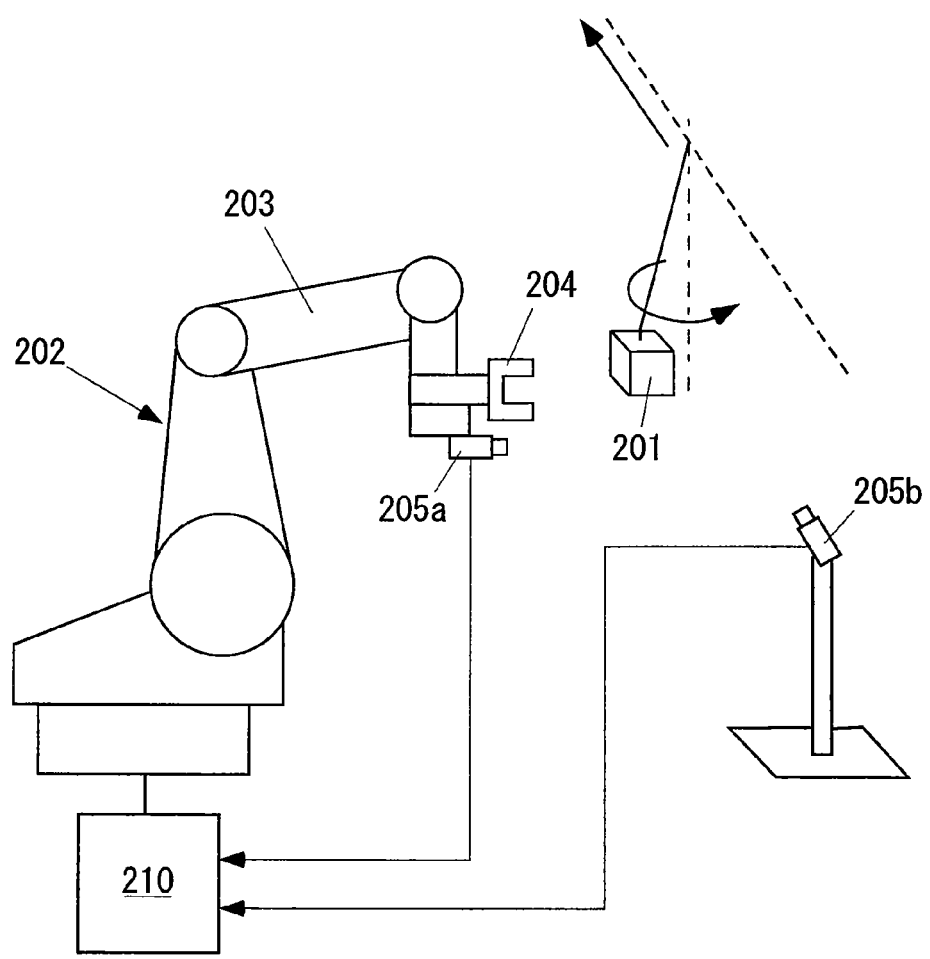
FIG. 11 is a diagram illustrating a configuration example of a robot system including a motion prediction control device according to a third embodiment of the present invention.

FIG. 11 illustrates a configuration example of a robot system that includes a motion prediction control device according to a third embodiment of the present invention.

In the drawing, the reference sign 201 denotes an object (workpiece), the reference sign 202 denotes a robot, the reference sign 203 denotes a robot arm, the reference sign 204 denotes a hand, the reference sign 205*a* denotes a first camera secured to the hand 204, the reference sign 205*b* denotes a second camera secured at an external fixed position, and the reference sign 210 denotes a motion prediction control device.

The robot system is configured such that the workpiece 201 that moves while performing a pendular motion, is measured by the cameras 205*a* and 205*b*, and the robot 202 is controlled to follow the workpiece 201 to grasp the workpiece 201 by the hand 204.

Figure 12:
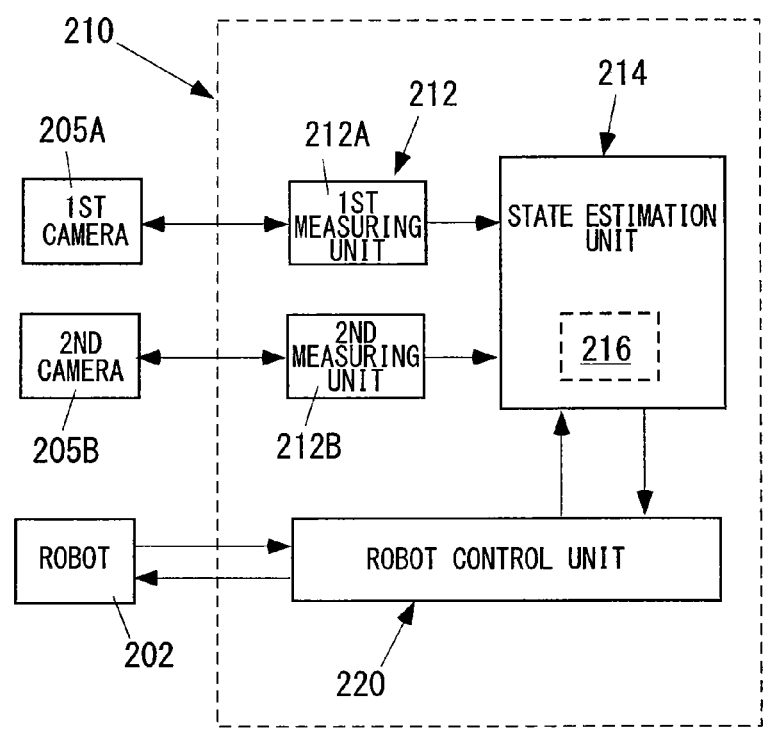
FIG. 12 is a configuration example of the motion prediction control device according to the third embodiment of the present invention.

FIG. 12 illustrates a configuration example of the motion prediction control device according to the third embodiment of the present invention.

In the drawing, the motion prediction control device 210 includes a measuring unit 212, a state estimation unit 214, and a robot control unit 220. The state estimation unit 214 is provided with a data storage unit 216.

The measuring unit 212 measures the position and the posture of the object 201.

The measuring unit 212 in this example includes two measuring units (a first measuring unit 212*a* and a second measuring unit 212*b*) that are connected to the first camera 205*a* and the second camera 205*b*, respectively.

More specifically, in this example, two cameras and two measuring units are used to capture images of the object 201 through the first camera 205*a* and the second camera 205*b*, and the position and the posture of the object 201 are determined by image processing. The determined position and posture of the object 201 are stored in the data storage unit 216.

The measuring unit 212 is not limited to this configuration, and may alternatively use a measuring unit, such as a laser radar, capable of performing, alone, three-dimensional measurement of the position of the object 201.

The state estimation unit 214 has functions to estimate (update) the internal state of the object 201, including an accuracy index value E (to be discussed hereinafter), on the basis of a state transition model and an observation model, from a measurement result of the measurement of the object 201, and to determine whether or not the object 201 can be grasped on the basis of the accuracy index value E.

A state estimation algorithm based on the algorithm of a Kalman filter is installed in the state estimation unit 214 in this example.

According to the state estimation algorithm, the following four are defined as the "state transition models."

Internal state at time t=0: $X_0$
Covariance of initial condition $X_0$: $C_{ov}X_0$
State transition equation: $X_{t+\Delta t} = f(X_t, \Delta t)$ ... (1)
Process noise (covariance) per unit time: Q According to the algorithm, all of state variables are referred to as an internal state X, together. These state variables include a deflection angle θ and an angular velocity Δθ of the pendulum by which the workpiece 1 is suspended, and the positions of supporting points x, y and z of the pendulum. When defining a model, an accurate initial condition is not necessarily known. Therefore, the covariance $C_{ov}X_0$ predicting the magnitude of the difference between the initial condition and an actual condition is defined.

The state transition equation (1) indicates how the internal state X changes with time. In this example, the state transition equation is defined mainly on the basis of a motion equation of the pendulum and the uniform linear motion of the supporting point positions.

The defined state transition equation (1) does not necessarily coincide with the actual motion of the object 201. Hence, the covariance Q, which indicates the magnitude of the difference from an actual motion arising when the state transition is calculated by the duration of unit time (Δt=1), is defined.

Further, the Kalman filter defines the "observation model" (an observation equation and an observation noise) of expressions (2) and (3), denoting the position and the posture of the object 201, which are calculated by the measuring unit 212, by a measurement value Y.

Observation equation: $Y_t = g(X_t)$ ... (2)
Observation noise (covariance): $C_{ov}S_t$ ... (3)

Observation equation (2) is an expression that associates the internal state X and the measurement value Y. Further, observation noise (3) denotes a covariance that indicates the magnitude of a measurement error involved in the measurement at time t and that depends on the resolution and the direction of viewpoint of a camera. The observation noise (3) is not a fixed value, but the observation noise (3) is calculated by the measuring unit 212 for each image and handed together with a measurement value over to the state estimation unit 214.

The robot control unit 220 has a function for predicting a destination of the object 201 on the basis of an estimation result (updating result) of the internal state and then controlling the robot 202 so as to perform a grasping motion in the case where the object 201 can be grasped.

The robot control unit 220 receives, for example, the information on the position of the hand tip from the robot 202, and transmits a hand tip velocity command value and a hand opening/closing command value. Such transmission and reception is carried out at a predetermined control cycle (a 4-ms cycle).

The following will explain the motion prediction control method according to the third embodiment of the present invention with reference to FIG. 12.

According to the method of the third embodiment: First, at the step (A), the position and the posture of the object 201 are measured as the sensor information by the measuring unit 212.

Then, at the step (B), from the obtained measurement results, the internal state of the object 201 including the accuracy index value E is estimated (updated) by the state estimation unit 214 on the basis of the state transition model, and at the step (C), whether the object 201 can be grasped or not is determined on the basis of the accuracy index value E.

Subsequently, at the step (D), if the object 201 can be grasped, then the robot control unit 220 predicts the destination of the object 201 on the basis of an estimation result of the internal state, and causes the robot 202 to perform a grasping motion. At the step (E), if the object 201 cannot be grasped, then the robot control unit 220 causes the robot 202 to move such that the measurement of the position and the posture of the object 201 can be continued.

The accuracy index value E includes the error between the prediction values of the predicted position and posture of the object 201 and the actual values thereof, and a covariance matrix that predicts the variance of the error on the basis of a state transition model and an observation model.

In the step (C) mentioned above, it is preferably determined that the object can be grasped if the square of a Mahalanobis distance $M_t$ obtained by dividing the error by the covariance matrix is smaller than a first threshold value, and the determinant of the covariance matrix is smaller than a second threshold value.

The first threshold value and the second threshold value are preset arbitrary threshold values.

Further, in the step (c) mentioned above, it may also be determined that the object can be grasped if the square of the Mahalanobis distance $M_t$ obtained by dividing the error by the covariance matrix is smaller than a third threshold value, and a trace of the covariance matrix is smaller than a fourth threshold value.

The third threshold value and the fourth threshold value are preset arbitrary threshold values.

The following will explain the operation of the motion prediction control device according to the third embodiment.

In the process (a1), the measuring unit 212 (the first measuring unit 212a and the second measuring unit 212b) transmits, at an arbitrary timing, a shutter signal to two cameras (the first camera 205a and the second camera 205b) to acquire a captured image.

In the process (a2), the measuring unit 212 acquires the information on the position and the posture of the object 201 (the measurement values Y) by carrying out image processing of the obtained image. For example, a white area in the image is extracted to determine the center of gravity.

In the process (a3), the time at which the shutter signal is transmitted from the measuring unit 212 is denoted by ty, and the observation noise $C_{ov}S_t$ is calculated on the basis of the orientations, the resolutions, and the like of the cameras 205a and 205b.

In the process (a4), the state estimation unit 214 compares the measurement value Y and a prediction value Ym of Y predicted by the state transition model and the observation model so as to correct the internal state X. In addition, the accuracy index value E that indicates the accuracy for predicting the position of the object 201 is calculated. The internal state is updated at an arbitrary timing that is independent of the control cycle of the robot control unit 220.

In the process (a5), the robot control unit 220 refers to a result supplied by the state estimation unit 214 at each control cycle to assess the accuracy index value E, thereby determining whether or not to start the grasping motion.

In the process (a6), when the grasping motion is started, the future position of the object 201 is predicted, and a hand tip velocity command value is calculated to aim at the predicted grasp position. If the grasping motion is not performed, then the hand tip velocity command value is calculated so as to enable the cameras 205a and 205b to continue to capture the object 201.

The details of the processing by the state estimation unit 214 in the process (a4) mentioned above will be given below. The processing details given below denote a general state estimation means that uses a Kalman filter.

At the step (b1), a state transition duration Δt is calculated on the basis of the measurement time ty and the current model time t. The initial value of the model time t is the time at which the measurement is started. Alternatively, the measurement time may be defined as the elapsed time that uses the start time as the starting point, and the initial value of the model time may be set to zero.

The state transition duration Δt is expressed by Δt=ty−t ... (4).

At the step (b2), the internal state at measurement time ty is predicted.

The prediction value of the internal state $X_{t+\Delta t}$ is expressed by $X_{t+\Delta t} = f(X_t, \Delta t)$ ... (1) defined by the state transition model described above.

At the step (b3), the covariance of the prediction value of the internal state at the measurement time is calculated. In this case, matrix A denotes the matrix obtained by partially differentiating the state transition equation f.

A covariance $C_{ov}X_{t+\Delta t|t}$ of the internal state before the update (b9) is represented by expression (5).

$$C_{ov}X_{t+\Delta t|t} = A_t(\Delta t) \cdot C_{ov}X_t \cdot A_t(\Delta t)^T + Q \cdot |\Delta t| \quad (5)$$

The partial differential matrix $A_t(\Delta t)$ of the state transition equation is represented by expression (6).

$$A_t(\Delta t) = (\partial f(X_t, \Delta t)/\partial X_t) \quad (6)$$

At the step (b4), a prediction value $Ym_{t+\Delta t}$ of the measurement value Y is predicted according to expression (7) by using an internal state prediction value and the observation equation.

$$Ym_{t+\Delta t} = g(X_{t+\Delta t}) \quad (7)$$

At the step (b5), a covariance $C_{ov}Y_{t+\Delta t}$ of a prediction value Ym is determined according to expression (8) on the basis of the covariance of an internal state prediction value. Matrix H denotes a matrix obtained by partially differentiating an observation equation g.

$$C_{ov}Y_{t+\Delta t} = H_t \cdot C_{ov}X_{t+\Delta t|t} \cdot H_t^T \quad (8)$$

The partial differential matrix $H_t$ of the observation equation is represented by expression (9).

$$H_t = (\partial g(X_t)/\partial X_t) \quad (9)$$

At the step (b6), in addition to the covariance $C_{ov}Y$ of the prediction value Ym, a covariance $V_{t+\Delta t}$ that takes into account the measurement error of a camera is determined according to expression (10). The symbol $C_{ov}S_{t+\Delta t}$ denotes an observation noise at time ty (=t+Δt), and is calculated by the measuring unit 212.

The covariance $V_{t+\Delta t}$ combines the covariance of the prediction value Ym and a camera observation noise, so that the covariance $V_{t+\Delta t}$ becomes a covariance that indicates the magnitude of the difference between the prediction value Ym and the observation value Y.

$$V_{t+\Delta t} = C_{ov}Y_{t+\Delta t} + C_{ov}S_{t+\Delta t} \quad (10)$$

At the step (b7), Kalman gain $K_{t+\Delta t}$ is calculated according to expression (11).

$$K_{t+\Delta t} = (C_{ov}X_{t+\Delta t|t} \cdot H_t^T)/(V_{t+\Delta t}) \quad (11)$$

At the step (b8), the internal state $X_{t+\Delta t}$ is updated according to expressions (12) and (13). The internal state before the update is denoted by $X_{t+\Delta t|t}$. The symbol Y denotes an observation value measured by a sensor.

$$eY_{t+\Delta t} = Ym_{t+\Delta t|t} - Y_{t+\Delta t} \quad (12)$$

$$X_{t+\Delta t} = X_{t+\Delta t|t} - K_{t+\Delta t} \cdot eY_{t+\Delta t} \quad (13)$$

At the step (b9), covariance $C_{ov}X_{t+\Delta t}$ of the updated internal state is calculated according to expression (14).

$$C_{ov}X_{t+\Delta t} = (I - K_{t+\Delta t}H_t)C_{ov}X_{t+\Delta t|t} \quad (14)$$

The processing of the steps (b1) to (b9) described above revises (i.e., updates) the internal state on the basis of the observation value at time ty. The update of the internal state is implemented at an arbitrary timing that is independent of the control cycle of the robot control unit 220.

Thus, the internal state gradually approaches a true value (e.g., the actual velocity of an object) as the entire system repeats the processing of the processes (a1) to (a6) described above.

To determine how close the internal state has approached a true value, the prediction value covariances $C_{ov}Y$ and V determined in the steps (b5) and (b6) mentioned above are assessed. These covariances indicate the magnitude of a prediction error in the case where the position and the posture of an object are predicted by using a current estimation result.

In the case where the state transition model and the observation model defined beforehand are accurate, the difference eY between an observation value and a prediction value exhibits a distribution based on the covariance V. Therefore, if the actual difference eY takes a value that is larger compared with V, then it means that the models defined beforehand are not correct. This assessment uses the Mahalanobis distance $M_t$ shown in expression (15).

$$M_t = (eY_t^T \cdot V_t^{-1} \cdot eY_t)^{0.5} \quad (15)$$

The state estimation unit 214, therefore, calculates the accuracy index value E, which indicates the accuracy of the current state estimation, as shown below after the processing of the steps (b1) to (b9).

At the step (b10), the accuracy index value E is calculated according to any one of (c1), (c2) and (c3) given below.

$$(c1): E = \exp(-M_{t+\Delta t}^2/2)/((2\pi)^m |V_{t+\Delta t}|)^{0.5} \quad (16)$$

where the symbols m, Y, Ym, and eY are expressed by the same numbers of variables.

$$(c2): E = \exp(-M_{t+\Delta t}^2/2)/(\text{trace}(C_{ov}Y_{t+\Delta t}))^{0.5} \quad (17)$$

(c3): the total sum of E in expression (16) or (17) on all past measurement results, such as E obtained by expression (18), where p denotes the number of variables of the internal state.

[Expression 1]

$$E = -2 \cdot \left[ -\frac{1}{2} \left\{ T \left( \log(2\pi) + \sum_{t=1}^{T} \log(|V_t|) + \sum_{t=1}^{T} (eY_t^T \cdot V_t^{-1} \cdot eY) \right) \right\} \right] + 2p \quad (18)$$

Expression (16) in (c1) is an expression for assessing the model suitability of a normal distribution, while expression (18) in (c3) denotes the information criterion (AIC).

Expression (17) in (c2) is characterized by the use of the trace of the covariance $C_{ov}Y$ as the denominator. In expression (16), the square root of the determinant of covariances denotes the volume of the distribution of eY. Meanwhile, the square root of the trace in expression (17) denotes the radius of a smallest sphere encompassing the distribution.

The details of the processing by the robot control unit 220 at the above-described processes (a5) and (a6) will now be given below.

Figure 13:
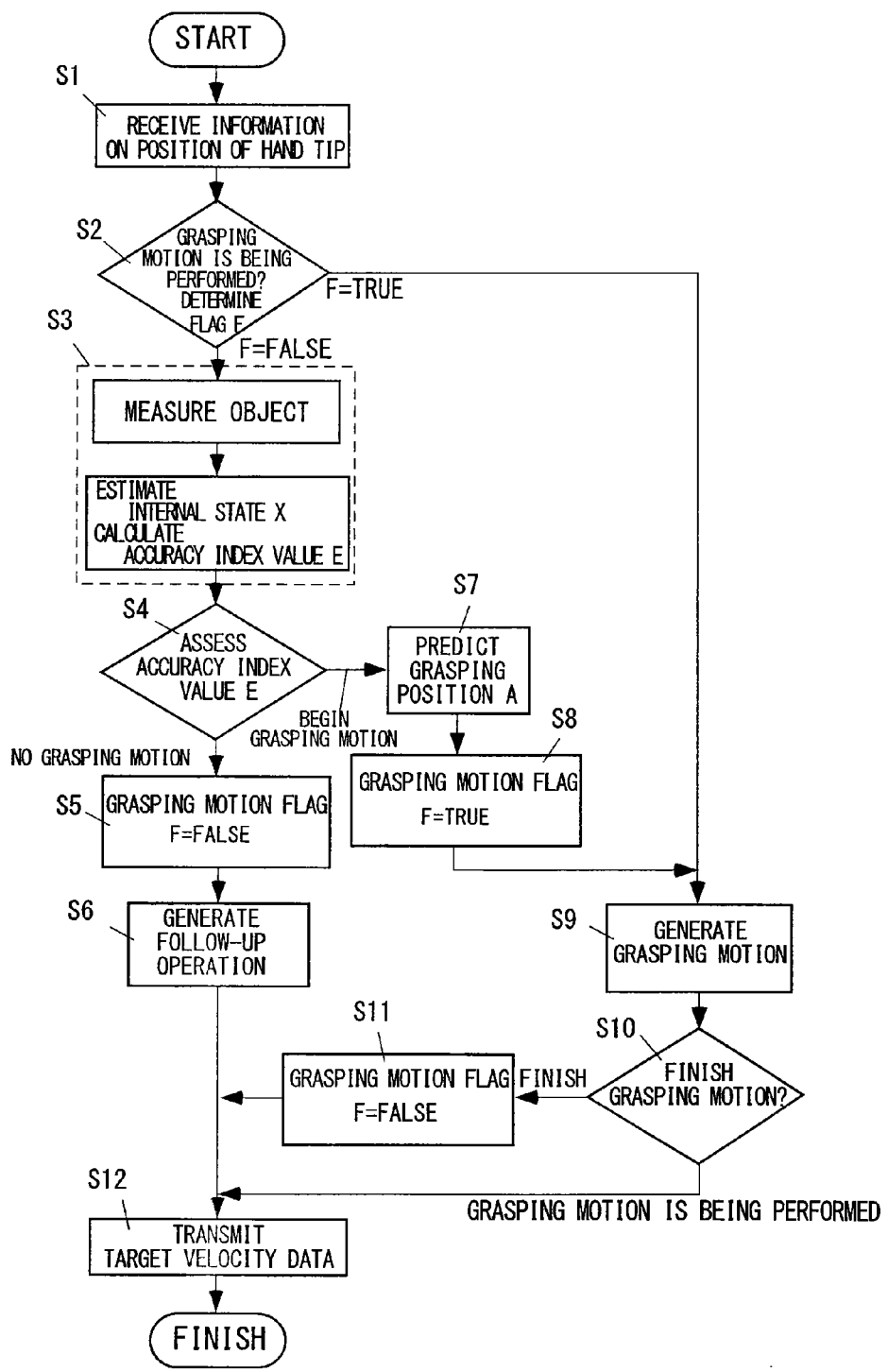
FIG. 13 is an entire flowchart of a motion prediction control method according to the third embodiment of the present invention.

FIG. 13 is an entire flowchart of a motion prediction control method according to the third embodiment of the present invention. As illustrated in the flowchart, the motion prediction control method includes steps (production processes) S1 to S12.

At the step S1, the information on a hand tip position and the like is received from the robot 202. The robot 202 controls the communication of the robot 202 such that the communication is carried out at a control cycle of, for example, 4 ms. Hence, the robot control unit 220 is required to stand by until data is received, and complete the transmission processing of the step S12 within the control cycle of, for example, 4 ms once data is received.

At the step S2, a flag F indicating that the grasping motion is being performed is determined. The flag F is initialized to "false" at the beginning of a program.

At the step S3, the processing from the process (a1) to the process (a4) described above is carried out if the grasping motion is not being performed. This processing may be carried out by a different processing system at an arbitrary execution cycle, while the robot control unit 220 refers to the latest estimation result and the accuracy index value E.

At the step S4, it is determined whether to perform the grasping motion or to continue a follow-up operation on the basis of the accuracy index value E of the current state estimation. As the determination means, one of the following means (d1) to (d3) is used.

In the means (d1), it is determined whether the accuracy index value E in (c1) described above exceeds a certain threshold value (a first threshold value). According to expression (16), an exponential part approaches zero as the Mahalanobis distance $M_t$ increases. Further, as the volume of the covariance V increases, the denominator increases. Therefore, the grasping motion is started only if the Mahalanobis distance $M_t$ is small and the volume of the covariance V is small.

In a case where two cameras (the first camera 205a and the second camera 205b) are used, as in this example, a situation in which the object 201 moves out of the field of view of one camera, and the measurement is continued using only one camera may happen. At this time, the measurement is made only with one viewpoint, causing the covariances $C_{ov}Y$ and V to become a covariance matrix exhibiting a long and narrow distribution in the direction of the line of sight of the camera. In the case of the means of (d1), the volume will be small even if V is long and narrow, so that the grasping motion may be started.

(d2) It is determined whether or not the accuracy index value E in (c2) described above exceeds a certain threshold value (a third threshold value). The accuracy index value E of expression (17) takes a small value in the case where $C_{ov}Y$ exhibits a long and narrow distribution. Accordingly, the grasping motion is started only if both two cameras capture the object 201.

(d3) Although the latest measurement results are used to make determinations in both (d1) and (d2) described above, the determination may be made, considering the accuracy index values for a few past points. For example, as with (c3) described above, a method in which the logarithms of the accuracy index values calculated in the past are summed up, or a method in which the average value of the values for a predetermined past duration is used may be adopted.

At the step S5, the grasping motion flag F is set as "false" if the grasping motion is not performed.

At the step S6, arm velocities Vx, Vy and Vz are set according to, for example, expressions (19), (20) and (21) given below if the grasping motion is not performed.

$$Vx = Kpx \cdot (mx - rx) + Kdx \cdot (mx - rx - pr\_x) \quad (19)$$

$$Vy = Kpy \cdot (my - ry) + Kdy \cdot (my - ry - pr\_y) \quad (20)$$

$$Vz = Kpz \cdot (mz - rz) + Kdz \cdot (mz - rz - pr\_z) \quad (21)$$

The control is PD control, the symbols mx, my and mz denote a measured current position [mm] of the object, the symbols rx, ry and rz denote the current position [mm] of a follow-up control point (a point on the sight line of a camera), the symbols pr_x, pr_y and pr_z denote positional differences (e.g., my−ry and mz−rz) calculated at a previous step, the symbol Kp denotes a position control gain, and the symbol Kd denotes a differential control gain.

At the step S7, if it is determined at the step S4 that the grasping motion is to be performed, then the future position and posture of the object 201 are predicted by using the state transition model and the observation model, to determine a grasping position A.

At the step S8, the grasping motion flag F is set as "true" at the beginning of the grasping motion.

At the step S9, during the grasping motion, the target velocity of the robot arm 203 is calculated such that the robot arm 203 moves to the grasping position A.

At the step S10, it is determined whether or not the grasping motion has been finished. For example, it is determined that the grasping motion has been finished if the robot arm 203 has reached the grasping position A, and the operation for closing the hand 204 has been finished.

At the step S11, when the grasping motion is terminated, the grasping motion flag F is set as "false." If the grasping motion is not to be terminated, then the grasping motion flag F remains "true," so that the grasping motion will be continued from the next cycle, by following the branch point of the step S2.

At the step S12, the calculated target velocity and the hand opening/closing command value are transmitted to the robot 202.

In the example described above, the Kalman filter is used as the method for estimating the motion state of the object 201. However, a different technique may be used as long as it is a state estimation technique that satisfies the conditions described below. For example, a particle filter, a least squares method, or the like may be applied.

(e1) Capable of estimating the motion state of the object 201, and predicting a future position thereof.

(e2) Capable of calculating a covariance matrix that indicates the variance of a predicted error when a future position is predicted.

In (c1) described above, the example wherein the determinant of V is used to make determination is presented. However, the determinant of either V or $C_{ov}Y$ may be used. Further, (c2) described above presents the example of the determination using the trace of $C_{ov}Y$. However, the trace of either V or $C_{ov}Y$ may be used.

In other words, "the covariance matrix expecting the variance of an error" may be either V or $C_{ov}Y$.

WORKING EXAMPLE 1

Figure 14:
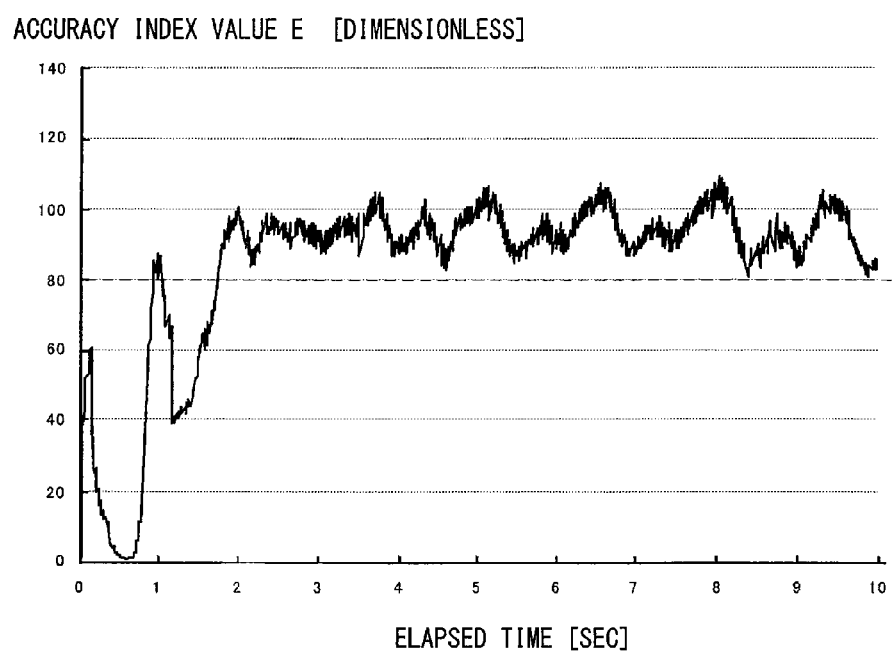
FIG. 14 is a chart illustrating the relationship between elapsed time and an accuracy index value E in an example of the third embodiment of the present invention.

FIG. 14 is a chart illustrating the relationship between the elapsed time and the accuracy index value E in the example.

This example concerns the results of the calculation of the accuracy index value E according to expression (17) of (c2) described above.

The chart indicates that the accuracy index value E gradually increases from a measurement start, and stabilizes at a value of 80 or more after the two seconds lapses from the measurement start.

It can be said, therefore, that grasping failure can be minimized by establishing a grasping motion starting condition that the accuracy index value E in expression (17) is 80 or more.

Further, as the chart illustrates, in the vicinity of the elapsed time of 1 second, the accuracy index value temporarily increases in some cases. For this reason, the determination is preferably made on the basis of the accuracy index values for a few past points, as with (c3) described above.

For example, the determination is based on an average value of a few past points that exceeds 80, or an average value that continues to exceed 80 for a predetermined duration or longer.

For example, "a condition that the accuracy index value continuously exceeds 80 for 120 ms or longer" is preferably set as the condition for starting the grasping motion.

According to the device and the method of the third embodiment of the present invention, by the measuring unit 212 and the state estimation unit 214, the position or the posture of the object 201 is measured, and the internal state of the object 201 is estimated. This makes it possible to predict the motion of the object 201 on the basis of the internal state (e.g., the position, the posture, the velocity and/or the angular velocity) of the object 201 (e.g., a workpiece) even in the case of other motions than a uniform linear motion, a uniform circular motion or a uniformly accelerated linear motion.

Further, on the basis of the state transition model and the observation model, the state estimation unit 214 estimates the internal state of the object 201 including the accuracy index value E, and determines from the accuracy index value E whether or not the object 201 can be grasped. Hence, if the object 201 cannot be grasped, then the robot control unit 220 moves the robot 202 such that, for example, the measurement of the position and the posture of the object 201 can be continued, thus preventing a grasping failure to occur in the case of a deteriorated prediction accuracy.

Further, if the object 201 can be grasped, then the robot control unit 220 predicts the destination of the object 201 on the basis of an estimation result of the internal state, and causes the robot 202 to perform the grasping motion, thus enabling the robot 202 to follow and securely grasp the object 201.

In the examples described above, the object 201 is mobile, whereas the robot 202 is fixed. However, the third embodiment of the present invention is not limited to the above-mentioned examples, and includes a case where an object is immobile, whereas a robot is mobile or a case where both an object and a robot are mobile.

Thus, "the movement of an object" in the third embodiment of the present invention means a relative movement of the object observed from a robot.

It is to be understood that the third embodiment of the present invention is not limited to the configuration examples described above, and includes all modifications that are indicated by the appended claims and that come within the meaning and range of equivalency of the claims.

REFERENCE SIGNS LIST

1: workpiece (object), 2 robot
3: robot arm, 4: hand,
5a: 1st camera, 5b: 2nd camera, 6: landmark
10: motion prediction control device,
12: measuring unit,
12a: 1st measuring unit, 12b: 2nd measuring unit
12c: 3rd measuring unit, 14: state estimation unit
15a: entire prediction section
15b: updating section, 16: data storage unit,
20: robot control unit, 21: receiver,
22: command value calculator, 23: transmitter,
24: on-robot predictor, 26: on-robot storage,
101: robot (self robot, other robot),
102: landmark, 103: internal sensor,
103a: gyro sensor, 103b: range sensor (LRF),
103c: wheel encoder, 103d: camera, 103e: GPS compass,
103f: steering angle encoder, 104: external sensor
110: motion prediction control device,
112: measuring unit, 114: state estimation unit,
115a: entire prediction section,
115b: updating section, 116: data storage unit,
120: robot control unit,
120A: 1st robot control unit,
120B: 2nd robot control unit,
120C: 3rd robot control unit,
121: drive section, 122: vehicle control section,
122a: command value calculating section,
123: action planning section,
123a: on-robot predictor,
123b: trajectory generating section,
124: measuring section, 125: communication section,
126: on-robot storage, 201: workpiece (object),
202: robot, 203: robot arm, 204: hand,
205a: 1st camera, 205b: 2nd camera,
210: motion prediction control device,
212: measuring unit,
212a: 1st measuring unit, 212b: 2nd measuring unit,
214: state estimation unit, 216: data storage unit,
220: robot control unit

The invention claimed is:

1. A motion prediction control device, comprising:
a measuring unit which acquires sensor information by measuring one or both of an object and a robot;
a state estimation unit which predicts and updates an internal state of one or both of the object and the robot on the basis of the sensor information;
a data storage unit which stores the internal state; and
a robot control unit which controls the robot,
wherein the state estimation unit updates the internal state at an arbitrary timing that is independent of a control cycle of the robot, and
the robot control unit calculates, at the control cycle, a prediction value required for controlling the robot on the basis of a latest internal state stored in the data storage unit.

2. The motion prediction control device according to claim 1,
wherein the measuring unit measures a relative relationship between the object and the robot as the sensor information, and the state estimation unit predicts and updates the internal state of the object or the robot,
the state estimation unit includes an entire prediction section which predicts the internal state, and an updating section which updates the internal state stored in the data storage unit, and
the robot control unit includes a prediction section on the robot that predicts, at the control cycle of the robot, the prediction value necessary for controlling the robot, (A) at an arbitrary timing that is independent of the control cycle, by the measuring unit, the state estimation unit, and the data storage unit, the relative relationship between the object and the robot is measured, the internal state of the object or the robot is predicted and updated, and the updated internal state and a state transition equation used for the prediction are stored, and (B) by the robot control unit, the prediction value is predicted at the control cycle on the basis of the latest internal state stored in the data storage unit, and the robot is controlled in real time on the basis of the prediction value.

3. The motion prediction control device according to claim 2, wherein the robot control unit includes an on-robot storage that stores the latest internal state stored in the data storage unit, and the data storage unit transfers, at a timing that is independent of a request from the robot, the latest internal state stored in the data storage unit to the on-robot storage.

4. The motion prediction control device according to claim 2, wherein the internal state is a state variable that indicates the position or the posture of the object or the robot, or the deflection angle of a pendulum by which the object is suspended, or a supporting point position of the pendulum.

5. The motion prediction control device according to claim 2, wherein the relative relationship to be measured is a relative position or a relative posture between the object and the robot.

6. The motion prediction control device according to claim 2, wherein the relative relationship to be measured is a relative velocity or a relative posture change between the object and the robot.

7. The motion prediction control device according to claim 1, wherein the measuring unit acquires the sensor information on the object or a plurality of robots at an arbitrary timing that is independent of the control cycle or cycles of the robot or robots, the state estimation unit predicts, upon the acquisition of the sensor information, the internal state of each robot at the same time as the time when the sensor information is acquired, and compares the predicted internal state with the sensor information to update the internal state, the data storage unit stores, upon the update, the updated internal state and the state transition equation used for the prediction, and a plurality of robot control units predicts prediction values necessary for the robots on the basis of the latest internal state stored in the data storage unit.

8. The motion prediction control device according to claim 7, wherein the plurality of robot control units predicts, at the control cycles of the respective robots, prediction values necessary for controlling the respective robots so as to control the plurality of robots in real time.

9. The motion prediction control device according to claim 7, wherein the state estimation unit includes an entire prediction section that predicts the internal state, and an updating section that updates the internal state predicted by the entire prediction section, and each of the robot control units includes an on-robot predictor that predicts, at the control cycle of the corresponding robot, a prediction value necessary for controlling the robot.

10. The motion prediction control device according to claim 7, wherein each of the robot control units includes an on-robot storage that stores the latest internal state stored in the data storage unit, and the data storage unit transfers, at a timing that is independent of a request from the robot, the latest internal state stored in the data storage unit to the on-robot storage.

11. The motion prediction control device according to claim 7, wherein the internal state is a state variable which indicates the position, the posture, the velocity or the angular velocity of the robot.

12. The motion prediction control device according to claim 1, wherein the robot is adapted to grasp an object that relatively moves, the measuring unit measures the position or the posture of the object as the sensor information, the state estimation unit updates the internal state of the object including an accuracy index value on the basis of a state transition model and an observation model from a measurement result of the measurement of the object, and determines whether or not the object can be grasped on the basis of the accuracy index value, and in the case where the object can be grasped, the robot control unit predicts the destination of the object on the basis of an update result of the internal state, and controls the robot so as to perform a grasping motion.

13. A motion prediction control method comprising the steps of:

(A) measuring one or both of an object and a robot by a measuring unit thereby to acquire sensor information;

(B) predicting an internal state of one or both of the object and the robot on the basis of the sensor information and updating the internal state by a state estimation unit;

(C) storing the internal state by a data storage unit; and (D) controlling the robot by a robot control unit, wherein at the step (B), the internal state is updated at an arbitrary timing that is independent of the control cycle of the robot by the state estimation unit, and at the step (D), a prediction value necessary for controlling the robot is calculated by the robot control unit at the control cycle on the basis of a latest internal state stored in the data storage unit.

14. The motion prediction control method according to claim 13, wherein the state estimation unit includes an entire prediction section that predicts the internal state, and an updating section that updates the internal state stored in the data storage unit, at the steps (A) to (C), at an arbitrary timing that is independent of the control cycle, by the measuring unit, the state estimation unit, and the data storage unit, the relative relationship between the object and the robot is measured as the sensor information, and the internal state of the object or the robot is predicted and updated, and the updated internal state and a state transition equation used for the prediction are stored, and an the step (D), by the robot control unit, at the control cycle, the prediction value is predicted on the basis of the latest internal state stored in the data storage unit, and the robot is controlled in real time.

15. The motion prediction control method according to claim 13, wherein at an arbitrary timing that is independent of the control cycle of the robot, at the step (A), sensor information on the object or a plurality of robots is acquired by the measuring unit, at the step (B), by the state estimation unit, the internal state of each robot at the same time as the time when the sensor information is acquired is predicted, the predicted internal state is compared with the sensor information to update the internal state, and at the step (C), the updated internal state and the state transition equation used for the prediction are stored by the data storage unit, and at the step (D), prediction values necessary for individual robots are predicted by a plurality of robot control units on the basis of the latest internal state stored in the data storage unit.

16. The motion prediction control method according to claim 15, wherein at the step (D), a prediction value necessary for controlling each robot is predicted at the control cycle of the corresponding robot, and a plurality of robots is controlled in real time.

17. The motion prediction control method according to claim 14, wherein the control cycle is a fixed cycle that is shorter than a processing interval of the measuring unit.

18. The motion prediction control method according to claim 13, wherein the robot is adapted to grasp an object that relatively moves, at the step (A), the position or the posture of the object is measured as the sensor information by the measuring unit, at the step (B), by the state estimation unit, the internal state of the object including an accuracy index value is updated from a measurement result of the measurement on the basis of a state transition model and an observation model, and whether the object can be grasped or not is determined on the basis of the accuracy index value, at the step (D), in the case where the object can be grasped, by the robot control unit, the destination of the object is predicted on the basis of an update result of the internal state, and the robot is caused to perform a grasping motion, and in the case where the object cannot be grasped, the steps (A) and (B) are repeated until the object becomes graspable.

19. The motion prediction control method according to claim 15, wherein the control cycle is a fixed cycle that is shorter than a processing interval of the measuring unit.

* * * * *